US006926875B2

(12) United States Patent
Hatanaka et al.

(10) Patent No.: US 6,926,875 B2
(45) Date of Patent: *Aug. 9, 2005

(54) POROUS MATERIAL PROCESS OF PRODUCING THE POROUS MATERIAL, CATALYST FOR PURIFYING EXHAUST GAS COMPRISING THE POROUS MATERIAL, METHOD OF PURIFYING EXHAUST GAS

(75) Inventors: Miho Hatanaka, Aichi (JP); Akihiko Suda, Aichi (JP); Toshiyuki Tanaka, Aichi (JP); Naoki Takahashi, Aichi (JP); Toshio Yamamoto, Aichi (JP); Yusuke Akimoto, Aichi (JP); Naohiro Terao, Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 358 days.

This patent is subject to a terminal disclaimer.

(21) Appl. No.: 10/262,097

(22) Filed: Oct. 2, 2002

(65) Prior Publication Data

US 2003/0185736 A1 Oct. 2, 2003

Related U.S. Application Data

(63) Continuation of application No. 09/481,525, filed on Jan. 12, 2000, now Pat. No. 6,511,642.

(30) Foreign Application Priority Data

| Jan. 12, 1999 | (JP) | P.11-004855 |
| Oct. 4, 1999 | (JP) | P.11-282454 |
| Dec. 15, 1999 | (JP) | P.11-356672 |
| Dec. 15, 1999 | (JP) | P.11-356673 |

(51) Int. Cl.[7] .......................... B01D 53/54; B01D 53/60
(52) U.S. Cl. .................. 423/239.1; 423/626; 423/627; 423/628; 502/304; 502/325; 502/336; 502/340; 502/349; 502/350; 502/406; 502/415

(58) Field of Search ................. 423/626–628; 502/304, 325, 336, 340, 349, 350, 406, 415

(56) References Cited

U.S. PATENT DOCUMENTS

| 4,422,960 A | 12/1983 | Shiroto et al. |
| 5,047,178 A | 9/1991 | Ganguli et al. |

(Continued)

FOREIGN PATENT DOCUMENTS

| EP | 0 685 258 | 12/1995 |

(Continued)

*Primary Examiner*—Stanley S. Silverman
*Assistant Examiner*—Maribel Medina
(74) *Attorney, Agent, or Firm*—Oblon, Spivak, McClelland, Maier & Neustadt, P.C.

(57) ABSTRACT

Disclosed are a porous material comprising particles without substantial fibrous structure and having pores, the pores having a mean pore diameter in a meson-pore region, sharp pore size distribution, and at least a part of the pores being connected three-dimensionally to form a three-dimensional network structure with random passages, the porous material preferably being of alumina and having a spongy structure or the porous material preferably being an aggregate of particles having an aspect ratio of 3 or less; a process of producing the porous material which includes a step of aging a system capable of becoming an oxide on thermal decomposition; a catalyst for exhaust gas purification having excellent $NO_x$ removal performance, high resistance against sulfur poisoning, and satisfactory high-temperature durability which comprises the porous material as a carrier having supported thereon a noble metal and an $NO_x$ storage component; and a method of exhaust gas purification using the catalyst.

20 Claims, 3 Drawing Sheets

U.S. PATENT DOCUMENTS

| | | | |
|---|---|---|---|
| 5,064,628 | A | 11/1991 | Chane-Ching et al. |
| 5,496,788 | A | 3/1996 | Domesle et al. |
| 5,622,684 | A | 4/1997 | Pinnavaia et al. |
| 5,718,878 | A | 2/1998 | Zhang |
| 5,795,559 | A | 8/1998 | Pinnavala et al. |
| 5,877,387 | A | 3/1999 | Park et al. |
| 5,955,049 | A | 9/1999 | Ogata et al. |
| 6,391,276 | B1 | 5/2002 | Suda et al. |
| 6,511,642 | B1 | 1/2003 | Hatanaka et al. |

FOREIGN PATENT DOCUMENTS

| | | |
|---|---|---|
| EP | 0 718 239 | 6/1996 |
| EP | 0 947 235 | 10/1999 |
| JP | 47-7694 | 4/1972 |
| JP | 55-27830 | 2/1980 |
| JP | 60-54917 | 3/1985 |
| JP | 60-108310 | 6/1985 |
| JP | 4-228422 | 8/1992 |
| JP | 5-186217 | 7/1993 |
| JP | 7-89724 | 4/1995 |
| JP | 07-64543 | 7/1995 |
| JP | 10-330110 | 12/1998 |
| WO | WO 98/15500 | 4/1998 |
| WO | WO 99/52627 | 10/1999 |
| WO | WO 99/57061 | 11/1999 |

50nm

50nm

POROUS MATERIAL PROCESS OF PRODUCING THE POROUS MATERIAL, CATALYST FOR PURIFYING EXHAUST GAS COMPRISING THE POROUS MATERIAL, METHOD OF PURIFYING EXHAUST GAS

BACKGROUND OF THE INVENTION

1. Field of the Invention

This invention relates to a porous material of an oxide and/or a complex oxide mainly comprising alumina, zirconia, titania, magnesia, iron oxide or ceria, a process of producing the porous material, a catalyst for purifying exhaust gases comprising the porous material, and a method of purifying exhaust gases.

More specifically, it relates to a porous material having a spongy structure which is suitable for use as a catalyst, a carrier for catalysts, various fillers, a carrier for enzymes, an adsorbent, a filler, and so forth and which is characterized in that (1) the mean pore diameter is in a meson-pore region, (2) the pores have a sharp size distribution, (3) at least a part of the pores form a three-dimensional network structure, and (4) the porous material has substantially no fibrous structure, and a porous material having the above characteristics (1) to (4) which is made up of particles having an aspect ratio of 3 or smaller aggregated together while leaving pores among them; and a process for producing these porous materials.

The present invention also relates to a catalyst and a method for purifying exhaust gases from internal combustion engines of automobiles and the like. More specifically, it relates to a three-way catalyst used for engines run around a stoichiometric air/fuel ratio and a catalyst used for so-called lean-burn engines operated in an oxygen-excess atmosphere. Still more specifically, the invention relates to a three-way catalyst for purifying exhaust gases from conventional engines through simultaneous reduction/oxidation of carbon monoxide (CO), hydrogen ($H_2$), hydrocarbons (HC), and nitrogen oxides ($NO_x$), a catalyst for efficiently reducing nitrogen oxides ($NO_x$) in oxygen-excess exhaust gases which contain oxygen in excess of the amount required to completely oxidize the reducing components, such as carbon monoxide (CO), hydrogen ($H_2$), and hydrocarbons (HC), and a method for purifying exhaust gases.

2. Description of Related Art

The present invention covers the field of a porous material and the field of exhaust gas purification. Disadvantages or drawbacks of related arts are described below separately.

With respect to an alumina porous material having an appropriate pore structure, JP-A-58-190823 and JP-A-60-54917 (the term "JP-A" as used herein means an "unexamined published Japanese patent application") disclose alumina carriers which have a large pore size with a narrow pore size distribution and yet exhibit excellent mechanical strength.

JP-A-55-27830 teaches a process for producing an alumina porous material having the above-described pore structure, which comprises repeating the steps of adjusting the pH of an aluminum hydroxide slurry to 5 or lower, or 11 or higher and then adjusting the pH to 6 to 10 by addition of a neutralizing agent (a pH swing method). Analogous methods are disclosed in JP-A-58-190823 and JP-A-60-54917.

In regards to a silica porous material having an appropriate pore structure, JP-B-7-64543 (the term "JP-B" as used herein means an "examined Japanese patent publication") discloses spherical silica particles having a pore volume of 0.8 to 1.8 ml/g, a surface area of 20 to 500 $m^2/g$, and an average pore size of 80 to 1000 Å. It also teaches a process for preparing the silica porous material comprising drying silica hydrogel, obtained by neutralization of an aqueous alkali silicate solution, with superheated steam at 100 to 1000° C. to give silica xerogel. According to the disclosure, it is preferred that the silica hydrogen be previously aged under 0.5 to 5 $kg/cm^2$ of steam for 0.5 to 24 hours.

As for a zirconia porous material, JP-A-8-66631 discloses porous zirconia particles having a sharp pore size distribution that is an important character for use in liquid chromatography, which are obtained by incorporating 0.1 to 10% by weight of silica into zirconium oxide so that the crystal form of zirconium oxide may be prevented from changing during calcination.

With reference to a titania porous material, JP-A-6-340421 proposes needle-like, porous, and fine titanium oxide particles having an average breadth of 80 to 120 Å, an average length of 240 to 500 Å, and an aspect ratio of 2.4 to 6.4, which is produced by a process comprising the steps of (a) allowing a hydrolyzable titanium oxide compound to react with a base to precipitate hydrated titanium oxide, (b) adding a polybasic carboxylic acid to the reaction system to dissolve the hydrated titanium oxide, (c) adding an alkali to the reaction system to hydrolyze the chelated titanium compound, (d) adding an inorganic acid to the precipitate and stirring the system to deflocculate, and (e) dehydrating the resulting fine particles and calcining at 200 to 400° C.

Concerning a magnesia porous material, JP-A-59-232915 discloses a process for producing spinel comprising adjusting the pH of a mixed aqueous solution of a water-soluble magnesium salt and a water-soluble aluminum salt with an alkali in the presence of an alcohol to form a precipitate and drying and calcining the precipitate.

As regards an iron oxide porous material, JP-A-61-268358 describes an iron oxide porous material comprising iron oxide and chromium oxide, having a large pore size with a narrow pore size distribution, and exhibiting excellent durability against oxidation and reduction. Similar prior arts are found with respect to a ceria porous material.

According to the above-mentioned pH swing method, which is substantially a method of producing alumina, the pH of boehmite (AlOOH), a precursor, is swung by use of an acidic material and an alkaline material to cause crystals to dissolve and to precipitate alternately thereby letting the crystals grow in a porous fibrous shape with a narrowpore size distribution. However, because the pH should be swung many times, the process is time-consuming and meets difficulty in controlling the conditions for product consistency. Further, when a second component is to be incorporated, it once settles but is then solubilized because of the pH variations, failing to be uniformly dispersed. Or, where a desired second component is such that forms a precipitate at a pH out of a range of from 6 to 11, it is impossible to incorporate the second component into the precursor. Furthermore, the conventional pH swing method does not provide an alumina porous material having a spongy structure nor a porous material comprising an aggregate of particles having an aspect ratio of 3 or smaller.

In particular, the porous materials described in JP-A-58-190823 and JP-A-60-54917 are composed of fibrous particles. When used as a catalyst carrier, a porous material comprising an aggregate of fibrous particles might be capable of supporting a noble metal in a high disperse state. However, as will be explained later in more detail, there will be a certain crystal plane along the fiber length direction so that the catalyst component tends to be supported on that plane in an increased proportion. This helps the catalyst component agglomerate in high temperature.

The spherical silica proposed in JP-B-7-64543 supra is composed of amorphous particles. Where used as a catalyst carrier, it provides no crystal plane to support a noble metal in a high disperse state. It follows that the noble metal particles easily move on the catalyst surface to undergo sintering, resulting in reduction of activity. Silica has lower affinity to noble metal than, for example, alumina, which also contributes to sintering of the supported noble metal particles and reduction of activity. Additionally, where the silica porous material is used in a three-way catalyst, coking occurs to deactivate the catalyst.

None of the aforementioned other prior arts relating to zirconia, titania, magnesia, iron oxide or ceria porous materials proposes a porous material having a spongy structure characterized in that (1) the mean pore diameter is in a meson-pore region, (2) the pores have a sharp size distribution, (3) at least a part of the pores have a three-dimensional network structure, and (4) the porous material has substantially no fibrous structure, or a porous material which is made up of an aggregate of particles having an aspect ratio of 3 or smaller and has the characteristics (1) to (4), still less a process for producing such porous materials.

On the other hand, a three-way catalyst has conventionally been used for treating auto exhaust gases, which catalyzes oxidation of CO and HC and reduction of $NO_x$ simultaneously. Conventional three-way catalysts widely known for this particular use comprise, for example, a heat-resistant base material made of, e.g. cordierite, a porous carrier layer of γ-alumina formed on the base material, and a noble metal catalyst component, such as platinum or rhodium, supported on the porous carrier layer. A three-way catalyst additionally containing ceria (cerium oxide) having oxygen storage ability to have increased low-temperature activity is also known (see JP-B-6-75675).

However, when these catalysts are exposed to high-temperature exhaust for a long time, the noble metal shows grain growth to reduce its catalytic activity on the simultaneous oxidation-reduction reactions of CO, $H_2$, HC, and $NO_x$ in exhaust gases. This is considered to be one of the causes for three-way catalysts to reduce their high-temperature durability.

Carbon dioxide ($CO_2$) in exhaust gases from internal combustion engines of automobiles and the like has now given rise to a serious problem to global environment conservation. A so-called lean-burn engine using a lean fuel mixture is a promising measures against this problem. Lean burn engines use less fuel thereby to suppress $CO_2$ generation.

Since the conventional three-way catalysts aim at simultaneous oxidation of CO and HC and reduction of $NO_x$ in exhaust gases at a stoichiometric air/fuel ratio, they are inadequate to reduce $NO_x$ in the oxygen-excess atmosphere as in the exhaust gas from lean-burn engines. Therefore, it has been demanded to develop an air cleaning system using a catalyst capable of removing $NO_x$ even in an oxygen-excess atmosphere.

Along this line, the present inventors have previously proposed a catalyst for purifying exhaust gases comprising an alkaline earth metal and platinum supported on a porous carrier of alumina, etc. (JP-A-5-317652) and a catalyst for purifying exhaust gases comprising lanthanum and platinum supported on a porous carrier (JP-A-5-168860). In these catalysts the oxide of an alkaline earth metal or lanthanum serves as a $NO_x$ storage component under lean conditions, and the stored $NO_x$ react with reducing components such as HC, CO, and $H_2$ generated under stoichiometric conditions or in the state of transition from stoichiometric conditions to fuel-rich conditions (at air/fuel ratios lower than the stoichiometric point). Accordingly, they exhibit excellent performance in $NO_x$ removal even under lean conditions.

However, an exhaust gas also contains sulfur oxides ($SO_x$) resulting from combustion of sulfur (S) present in fuel. $SO_x$ are oxidized by metallic catalyst components under lean conditions and also react with steam to generate sulfite ions or sulfate ions. The sulfite or sulfate ions can react with the $NO_x$ storage component to convert the $NO_x$ storage component to its sulfite or sulfate. This phenomenon is called sulfur poisoning. Sulfur poisoning impairs the $NO_x$ storing activity of the $NO_x$ storage component, which seems to be one of the causes of reduction in $NO_x$ removal performance. Upon being heated in a reducing atmosphere, the sulfite or sulfate releases sulfur and returns to its active form. However, if the sulfite or sulfate grows in grains, the sulfur content is hardly released by heating in a reducing atmosphere, and the $NO_x$ storing activity is hardly restored.

The recent improvements on engine combustion have made it possible to run lean-burn engines up to a high load, which has further increased the demand for a catalyst for purifying exhaust gases which have higher $NO_x$ removal performance. That is, the situation has required that a catalyst for purifying exhaust gases should have high $NO_x$ removal performance even in a high-temperature exhaust gas and undergo no reduction in $NO_x$ removal performance even when exposed to a high-temperature exhaust gas for a long time (this property will hereinafter be sometimes referred to as high-temperature durability).

However, when a catalyst for purifying exhaust gases is exposed to high-temperature exhaust for a long time, the noble metal shows grain growth to reduce its catalytic activity on the oxidation-reduction reactions. This is considered to be one of the causes of reduction in high-temperature durability of the catalyst.

SUMMARY OF THE INVENTION

A first object of the invention is to provide a novel alumina porous material which is amorphous and has a spongy structure characterized in that (1) the mean pore diameter is in a meson-pore region, (2) the pores have a sharp size distribution, (3) at least a part of the pores have a three-dimensional network structure, and (4) the porous material has substantially no fibrous structure, i.e., a spongy and porous structure of alumina whose pore sizes are highly concentrated in the vicinity of the mean pore diameter.

A second object of the invention is to provide a novel porous material made-up of aggregated particles having an aspect ratio of 3 or smaller which has the above-described characteristics (1) through (4), i.e., a porous material wherein the particles have an aspect ratio of 3 or smaller and aggregate together to form pores among the particles and whose pore sizes are highly concentrated in the vicinity of the mean pore diameter.

A third object of the invention is to provide a process for producing the above-mentioned porous materials easily and economically.

A fourth object of the invention is to provide a process for producing a porous material, which process permits addition of a second component for improving the quality of the porous material.

A fifth object of the invention is to provide a catalyst excellent in exhaust gas purifying ability. More particularly, the object is to suppress grain growth of a noble metal which occurs in a high-temperature exhaust gas and/or grain growth of sulfites or sulfates produced by the reaction between $SO_x$ and an $NO_x$ storage component, thereby to provide a catalyst for exhaust gas purification which is excellent in high-temperature durability, $NO_x$ removal performance, and resistance against sulfur poisoning.

A sixth object of the invention is to provide a method of purifying exhaust gases using the above-described catalyst.

The first and second objects of the invention are accomplished by a porous material comprising particles without substantial fibrous structure and having pores, the pores having a mean pore diameter in a meson-pore region, a sharp pore size distribution, and at least a part of the pores being connected three-dimensionally to form a three-dimensional network structure with random passages. The mean pore diameter preferably is in a range of from 2 to 100 nm. There is thus provided a novel porous material suited for use as a catalyst, a carrier for catalysts, various filters, a carrier for enzymes, an adsorbent, a filler, and so forth.

The porous material of the present invention is, in its first aspect, a porous material wherein said particles are alumina, and the three-dimensional network structure has a spongy structure. It is preferred that this porous material be amorphous and the pores exist on the surface and in the inside thereof. The first aspect provides a novel porous material satisfying the first object of the invention and useful in the above-described applications.

The porous material according to the first aspect includes:
(1) an embodiment in which the volume of the pores within ±5 nm at the mean pore diameter of the total meson-pore volume occupies 70% or more,
(2) an embodiment in which the volume of the pores within ±5 nm at the mean pore diameter of the total meson-pore volume occupies 80% or more, or the volume of the pores within ±3 nm at the mean pore diameter of the total meson-pore volume occupies 70% or more,
(3) an embodiment in which the volume of the pores within ±5 nm at the mean pore diameter of the total meson-pore volume occupies 90% or more, or the volume of the pores within ±3 nm at the mean pore diameter of the total meson-pore volume occupies 80% or more, and
(4) an embodiment in which the volume of the pores within ±3 nm at the mean pore diameter of the total meson-pore volume occupies 90% or more.

Having such a sharp pore size distribution, the porous material is particularly useful in reaction, separation, adsorption, desorption or the like operation in which molecules take part as hereinafter described in detail.

The porous material according to the first aspect is obtained by precipitating at least a part of an aluminum component from an aluminum salt aqueous solution at a pH 3 to 4.5, aging the aqueous solution as containing the precipitate in saturated vapor or nearly saturated vapor for a prescribed period of time to produce a precursor, and calcining the precursor. It is preferred that the calcination of the precursor is to remove water to make amorphous while retaining the grain arrangement of the precursor.

The porous material according to the invention is, in its second aspect, a porous material wherein the particles have an aspect ratio of 3 or smaller and aggregate together to form pores among the particles. It is preferred that the particles are crystalline oxides in which said crystalline oxide particles are connected three-dimensionally to form pores among the particles. The second aspect provides a novel porous material which meets the second object of the invention and is suited for use in the above-described applications.

Specifically, the porous material according to the second aspect comprises at least one of crystalline oxides and crystalline complex oxides selected from the group consisting of alumina, zirconia, titania, magnesia, iron oxide, and ceria.

The alumina porous material of the second aspect includes:
(1) an embodiment in which the volume of the pores within ±5 nm at the mean pore diameter of the total meson-pore volume occupies 70% or more,
(2) an embodiment in which the volume of the pores within ±5 nm at the mean pore diameter of the total meson-pore volume occupies 80% or more, or the volume of the pores within ±3 nm at the mean pore diameter of the total meson-pore volume occupies 70% or more,
(3) an embodiment in which the volume of the pores within ±5 nm at the mean pore diameter of the total meson-pore volume occupies 90% or more, or the volume of the pores within ±3 nm at the mean pore diameter of the total meson-pore volume occupies 80% or more, and
(4) an embodiment in which the volume of the pores within ±3 nm at the mean pore diameter of the total meson-pore volume occupies 90% or more.

Having such a sharp pore size distribution, the porous alumina material is particularly useful in reaction, separation, adsorption, desorption or the like operation in which molecules take part as hereinafter described in detail.

The porous material of the second aspect comprising other oxides than alumina includes:
(5) a zirconia porous material in which the volume of the pores within ±5 nm at the mean pore diameter of the total meson-pore volume occupies 40% or more,
(6) a titania porous material in which the volume of the pores within ±5 nm at the mean pore diameter of the total meson-pore volume occupies 50% or more, or the volume of the pores within ±3 nm at the mean pore diameter of the total meson-pore volume occupies 40% or more,
(7) a magnesia porous material in which the volume of the pores within ±5 nm at the mean pore diameter of the total meson-pore volume occupies 80% or more,
(8) an iron oxide porous material in which the volume of the pores within ±5 nm at the mean pore diameter of the total meson-pore volume occupies 40% or more, and
(9) a ceria porous material in which the volume of the pores within ±5 nm at the mean pore diameter of the total meson-pore volume occupies 70% or more, or the volume of the pores within ±3 nm at the mean pore diameter of the total meson-pore volume occupies 55% or more.

Similarly to the alumina porous material, the porous materials of oxides other than alumina have such a sharp pore size distribution and are useful in reaction, separation, adsorption, desorption or the like operation in which molecules take part.

The porous material according to the second aspect is obtained by aging in saturated vapor or nearly saturated vapor for a prescribed period of time a system capable of becoming an oxide on thermal decomposition to produce a precursor and calcining the precursor. It is preferred that the calcination of the precursor is to remove solvent to make an oxide while retaining the grain arrangement of the precursor.

It is preferred for the alumina porous material of the second aspect to contain at least one element selected from rare earth elements, alkaline earth metals, and group IV elements as an additive component. It is particularly preferred to add lanthanum as a rare earth element and/or at least one of titanium, silicon and zirconium as a group IV element. Such a second component added brings about improved heat resistance or arbitrarily modifies various characteristics, such as acidity or basicity, according to the end use and is particularly effective in preparing a catalyst for purifying exhaust gases or a catalyst for modifying fuel.

The third and fourth objects of the invention are accomplished by a process for producing a porous material comprising the steps of:

(1) preparing a system capable of becoming an oxide on thermal decomposition,
(2) aging the system at or above room temperature for a prescribed time to form a precursor, and
(3) calcining the precursor.

According to this process the porous material according to the invention can be produced easily and economically. In particular, where it is desired to add a second component to the porous material according to the second aspect to improve or modify the quality of the porous material, the process easily permits such addition.

Step (1) preferably includes embodiments, wherein:
(a) the system contains a solvent,
(b) the system is a solvated system,
(c) the solvent is water, a monohydric alcohol, a dihydric alcohol, a trihydric alcohol, or a mixture of one or more thereof,
(d) the solvent is water, a monohydric alcohol or a mixture thereof,
(e) the system consists of at least one of a hydroxide of aluminum, zirconium, titanium, magnesium, iron or cerium and a salt of aluminum, zirconium, titanium, magnesium, iron or cerium,
(f) the system comprises at least one of a hydroxide of aluminum, zirconium, titanium, magnesium, iron or cerium and a salt of aluminum, zirconium, titanium, magnesium, iron or cerium as a main component, and optionally at least one of a rare earth element, an alkaline earth metal, and a group IV metal as an additive component,
(g) the above-enumerated hydroxide or salt is immersed in a solvent, and
(h) the system is a precipitate immersed in a solvent, the precipitate being formed from an aluminum salt, a zirconium salt, a titanium salt, a magnesium salt, an iron salt or a cerium salt.

Step (2), an aging step, is preferably carried out by aging the system prepared in step (1) in saturated vapor (preferably steam) or nearly saturated vapor for a prescribed period of time to form a precursor. Where steam is used, the temperature of the steam is preferably 200° C. or lower, still preferably 80 to 150° C., particularly preferably 100 to 130° C. The aging time is usually from 0.5 to 200 hours.

Step (3), a calcining step, is preferably carried out by removing the solvent while retaining the grain arrangement of the precursor. The calcining temperature, while dependent on the kind of the desired porous material, usually ranges from 300 to 1200° C.

The fifth object of the invention, particularly suppressing grain growth of a noble metal which occurs in a high-temperature exhaust gas, is achieved by a catalyst for purifying exhaust gases which comprises, in its first aspect, a carrier and a noble metal supported on the carrier, in which at least a part of the carrier comprises the porous material according to the invention (inclusive of the first and the second aspects of the porous material).

As stated above, since the porous material according to the invention comprises particles without substantial fibrous structure and has pores having (1) a mean pore diameter in a meson-pore region, (2) sharp pore size distribution, and (3) at least a part of the pores being connected three-dimensionally to form a three-dimensional network structure with random passages, the following actions and effects are assumed.

Because of the characteristic (1), a noble metal can be supported stably and in a highly disperse state. Owing to the characteristic (2), a noble metal can be supported uniformly, starting points of grain growth hardly generate, and grain growth of the noble metal in high temperature can be restrained.

By virtue of the characteristics (1) and (3), unburnt HC, CO, $NO_x$, etc. in an exhaust gas passing through the pores are diffused throughout the catalyst while reacting efficiently.

Further, since the porous material according to the present invention comprises particles without substantial fibrous structure, this characteristic secures prevention of the noble metal from agglomeration and grain growth thereby to provide a catalyst for purifying exhaust gases excellent in high-temperature durability. If the particles making up the carrier is fibrous, there is a certain crystal plane that is along the fiber direction. As a result, a noble metal, even though supported in a highly disperse state, will be supported on the same crystal plane in an increased proportion and therefore tend to agglomerate as compared with one supported on different crystal planes.

As compared with such a fibrous carrier, since the porous material according to the second aspect is made up of particles having an aspect ratio of 3 or less, the crystal planes are limited by the particle size so that the crystal planes on which a noble metal is supported are limited. As a result, the noble metal particles hardly agglomerate among themselves, and grain growth of the noble metal in high temperature can be hindered.

In case where the particles constituting a carrier is amorphous, lack of a crystal plane (on which a noble metal can be held) allows noble metal particles to move easily and agglomerate on the surface of the carrier even though the particles could be supported in a highly disperse state. In contrast, although the porous material according to the first aspect is made up of amorphous particles, it has a spongy structure with pores being made of recesses, so that noble metal particles can be held in the pores stably, being prevented from agglomerating among themselves and growing in grains in high temperature.

Thus, use of the porous material according to the invention as a carrier provides a catalyst which is particularly excellent in exhaust gas purifying ability and high-temperature durability.

In a preferred embodiment, the catalyst according to the first aspect has the noble metal concentrated in the vicinity of the carrier surface. Thus, a well-known method of depositing a noble metal on a carrier can be applied to the porous material of the invention to have the noble metal supported on the surface of the porous material in a high concentration thereby providing a catalyst excellent in exhaust gas purification performance in which grain growth of a noble metal is suppressed.

In order to accomplish the fifth object of the invention, particularly in order to suppress grain growth of sulfites or sulfates generated by the reaction between $SO_x$ and an $NO_x$ storage component and/or grain growth of a noble metal which occurs particularly in a high-temperature exhaust gas thereby to provide a catalyst for purifying exhaust gases having high $NO_x$ removal performance, high resistance against sulfur poisoning, and high high-temperature durability, the present inventors have extensively studied on a catalyst comprising a carrier, an $NO_x$ storage component comprising at least one of an alkali metal, an alkaline earth metal, and a rare earth element that is supported on the carrier, and a noble metal supported on the carrier. As a result, they have surprisingly found that use of the porous material having a specific structure according to the invention as a carrier provides a catalyst having excellent $NO_x$ removal performance, high sulfur poisoning resistance and satisfactory high-temperature durability and a method of purifying exhaust gases.

Accordingly, the catalyst for purifying exhaust gases according to the second aspect comprises a carrier, an $NO_x$ storage component comprising at least one of an alkali metal, an alkaline earth metal, and a rare earth element that is supported on the carrier, and a noble metal supported on the carrier, in which at least a part of the carrier comprises the porous material of the invention (inclusive of the porous material according to the first aspect and that of the second aspect).

The structure and the mechanism of actions and effects of the catalyst according to the second aspect will be described below in detail. Note that the description about the mechanism of action contains some unexamined assumptions so that whether it is right or wrong is not deemed to restrict the invention.

The porous material, which constitutes at least a part of the carrier, is characterized by comprising particles without substantial fibrous structure and having pores, the pores having a mean pore diameter of the pores being in a range of 2 to 100 nm, sharp pore size distribution, at least a part of the pores being connected three-dimensionally to form a three-dimensional network structure with random passages.

It is assumed that these characteristics of the carrier have the following actions.

To have a mean pore diameter of 2 nm or greater secures adsorption of the $NO_x$ storage component and the noble metal onto the carrier. Further, the catalyst can taken in exhaust gas components for certain without suffering from clogging of the pores, thereby achieving exhaust gas purification through the oxidation-reduction reactions with certainty.

To have a mean pore diameter of 100 nm or smaller is effective at preventing sulfite or sulfate grains produced by the reaction between $SO_x$ in an exhaust gas and the $NO_x$ storage component from growing and in confining them to the size of the pores. As a result, the sulfites or sulfates are ready to decompose on shifting the air/fuel ratio from a stoichiometric point to a fuel-rich side. Thus, the $NO_x$ storage component can be prevented from reducing its $NO_x$ storage ability.

To have a mean pore diameter of 100 nm or smaller also produces an effect in suppressing grain growth of a noble metal that is liable to occur particularly in a high-temperature exhaust gas and thereby minimizing the reduction in catalytic activity.

Where at least a part of the pores are connected three-dimensionally to form random passages, the passages forming a three-dimensional network structure, the noble metal serving for catalysis can be supported on the carrier stably and in a high disperse state.

In case where a porous material has a fibrous structure, a noble metal is apt to be supported on a crystal plane that is present along the fiber direction. A noble metal on a fibrous porous material, even if highly dispersed, tends to grow in grain in high temperature. Since the porous material used as a carrier of the catalyst according to the second aspect has substantially no fibrous structure, grain growth of the noble metal attributed to a fibrous structure does not take place so that the noble metal can be protected from reduction of activity even in high temperature.

Based on these actions, there is provided a catalyst for purifying exhaust gases having high $NO_x$ removal performance, high sulfur poisoning resistance, and excellent high-temperature durability, that is, a catalyst that retains the $NO_x$ storage ability of the $NO_x$ storage component and the catalytic activity of the noble metal with certainty while suppressing grain growth of sulfites or sulfates generated by the reaction between $SO_x$ and an $NO_x$ storage component and/or grain growth of the noble metal which occurs particularly in a high-temperature exhaust gas.

In a first embodiment of the catalyst according to the second aspect, the pores of the carrier are those formed by aggregation of particles having an aspect ratio of 3 or less (the carrier used here corresponds to the porous material according to the second aspect). In this embodiment, a noble metal, a catalyst component, can be supported stably and in a highly disperse state on the carrier thereby to provide a catalyst with high $NO_x$ removing ability.

In this first embodiment, the particles constituting the porous carrier are preferably crystalline particles of an oxide. In this case, the carrier has crystal planes, and the noble metal, hardly moving on the carrier surface, is inhibited from agglomerating. There is thus provided a catalyst for purifying exhaust gases exhibiting particularly high $NO_x$ removal performance.

The oxide is an oxide and/or a complex oxide selected from the group consisting of alumina, zirconia, titania, magnesia, iron oxide, and ceria. Any of the above-described oxides can be used as particles constituting the porous carrier, there are provided catalysts which take advantage of alumina, zirconia, titania, magnesia, iron oxide or ceria.

The porous material can contain at least one of a rare earth element, an alkaline earth metal, and a group IV element as an additive component so as to have improved heat resistance or modified characteristics. Naturally, the heat resistance or various characteristics of the resulting catalyst are also improved or modified. In particular, addition of lanthanum as a rare earth element brings about improvement in heat resistance to provide a highly heat-resistant catalyst for purifying exhaust gases.

In a second embodiment of the catalyst according to the second aspect, the porous material as a carrier is of alumina, and the alumina porous material has a spongy structure and is amorphous (the carrier used here corresponds to the porous material according to the first aspect). Because the alumina porous material is amorphous and yet has a spongy structure, the pores are made of recesses in which noble metal grains can be settled stably, being prevented from growing in grains. The catalyst therefore maintains high $NO_x$ removal performance.

In a third embodiment of the catalyst according to the second aspect, the porous material used as a carrier has such a pore size distribution that the volume of the pores whose diameter is in a range of from 2 to 20 nm in the total volume of the pores whose diameter is in a range of from 2 to 100 nm occupies 70% or more (the carrier used here corresponds to the porous material of the invention, inclusive of the first and second aspects thereof). In this embodiment, sulfites or sulfates produced by the reaction between $SO_x$ present in exhaust gas and the $NO_x$ storage component are inhibited from grain growth and confined in size with certainty. As a result, the sulfites and sulfates are ready to decompose so that reduction of the $NO_x$ storage ability of the $NO_x$ storage component can be minimized. Also, the noble metal can retain its catalytic activity because it is suppressed from grain growth particularly in a high temperature exhaust gas with certainty. There is thus obtained a catalyst for purifying exhaust gases superior in $NO_x$ removal performance, resistance to sulfur poisoning, and high-temperature durability.

The method for purifying exhaust gases which accomplishes the sixth object of the invention comprises setting the catalyst having the aforementioned actions according to the second aspect in an oxygen-excess exhaust gas (air/fuel weight ratio of 18 or higher) to store the $NO_x$ in the $NO_x$ storage component from the exhaust gas containing $NO_x$, making the stored $NO_x$ released from the $NO_x$ storage component and reducing the released $NO_x$ by periodically shifting the air/fuel weight ratio of an engine from a stoichiometric point to a fuel excess side, and, at the same time, decomposing sulfites or sulfates.

The exhaust gas purifying method of the invention is capable of accelerating the decomposition of sulfites or sulfates produced by the reaction between $SO_x$ and the $NO_x$ storage component while certainly retaining the $NO_x$ storage ability of the $NO_x$ storage component and the catalytic activity of the noble metal. Therefore, the method achieves high performance in $NO_x$ removal and high resistance against sulfur poisoning.

BRIEF DESCRIPTION OF THE DRAWINGS

FIGS. 1A and 1B schematically illustrate the porous materials according to the invention, in which FIG. 1A shows the first aspect, and FIG. 1B the second one.

DETAILED DESCRIPTION OF THE INVENTION

In what follows, the porous material according to the first aspect will be referred to as "the first porous material", and that of the second aspect "the second porous material". Where no distinction needed, both of them will be inclusively referred simply as "the porous material of the invention" or an equivalent language.

The porous material of the invention comprises particles without substantial fibrous structure and has pores, the pores having a mean pore diameter in a meso-pore region, sharp pore size distribution, and at least a part of the pores being connected three-dimensionally to form a three-dimensional network structure with random passages. The mean pore diameter preferably is in a range of from 2 to 100 nm.

The porous material is a so-called meso-porous material and in which at least a part of the pores are connected not in one direction but in three dimensional directions to form a three-dimensional network structure with random passages. As will be appreciated, the porous material of the invention is clearly different from the FSM porous material disclosed in JP-A-10-87319. The FSM porous material disclosed, which is also a meso-porous material, has structural meso-pores arrayed in one direction formed by bending of sheet $SiO_2$.

"To have substantially no fibrous structure" means to have no such a structure that fibrous particles having an aspect ratio greater than 3 are aggregated to form pores among them. In this regard, both the first porous material, which is a spongy structure having substantially no fibrous structure, and the second porous material, which is an aggregate of particles having an aspect ratio of 3 or smaller, are clearly different from an aggregate of fibrous particles having an aspect ratio greater than 3.

Figure 1A:
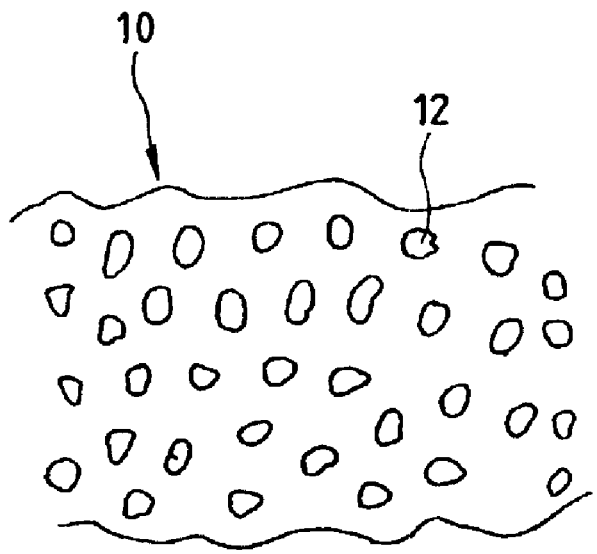

FIG. 1A illustrates the first porous material 10, more specifically the outermost surface of an amorphous particles constituting the porous material 10. Pores 12 are not such that are independently formed on the same plane as might been seen from the Figure, but at least a part of the pores are connected to each other inside the amorphous particle to form a three-dimensional network structure. That is, the porous material 10 is amorphous having a spongy structure. The porous material 10 has pores 12 whose mean pore diameter is in a meso-pore region with a sharp meso-pore size distribution, at least a part of the pores are connected in the inside of the amorphous particle to form a three-dimensional network structure with random passages.

Figure 1B:
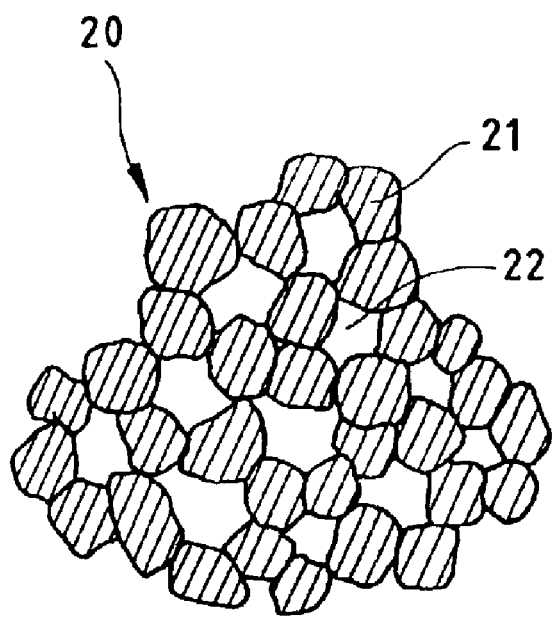

FIG. 1B schematically shows the second porous material 20, more specifically the outermost surface of an aggregate of particles 21. The particles 21 are not such that are arranged on the same plane but are sparsely aggregated to form a three-dimensional network structure. That is, the porous material 20 is a sparse aggregate of particles 21 having an aspect ratio of 3 or less and an averaged size (fine particles of a crystalline oxide). Pores 22 are interstices formed among the particles 21 connecting to each other three-dimensionally and have a mean pore size in a meso-pore region. The individual particles 21 being relatively regular in shape and size, the pore size distribution is narrow. At least a part of the pores 22 are connected not in one direction but in three dimensional directions to form a three-dimensional network structure with random passages.

The first porous material is an alumina porous material having a spongy structure and possesses the aforementioned characteristics. The second porous material is an aggregate of particles having an aspect ratio of 3 or less which has the aforementioned characteristics. More specifically, the second porous material comprises a crystalline oxide selected from alumina, zirconia, titania, magnesia, iron oxide and ceria.

The mean pore size and pore size distribution of the first porous material vary depending on the conditions of production, and those of the second porous material depend on not only the conditions of production but the kind of the oxide. The first porous material and, among the second porous materials, the alumina porous material can have the pore size distribution (a) or (b):

(a) the volume of the pores within ±5 nm at the mean pore diameter of the total meso-pore volume occupies 70% or more, preferably 80% or more, still preferably 90% or more, or (b) the volume of the pores within ±3 nm at the mean pore diameter of the total meso-pore volume occupies 70% or more, preferably 80% or more, still preferably 90% or more.

The second porous materials other than the alumina-porous material can have the following pore size distribution:

(c) Zirconia porous material: the volume of the pores within ±5 nm at the mean pore diameter of the total meso-pore volume occupies 40% or more.

(d) Titania porous material: the volume of the pores within ±5 nm at the mean pore diameter of the total meso-pore volume occupies 50% or more, or the volume of the pores within ±3 nm at the mean pore diameter of the total meso-pore volume occupies 40% or more.

(e) Magnesia porous material: the volume of the pores within ±5 nm at the mean pore diameter of the total meso-pore volume occupies 80% or more.

(f) Iron oxide porous material: the volume of the pores within ±5 nm at the mean pore diameter of the total meso-pore volume occupies 40% or more.
(g) Ceria porous material: the volume of the pores within ±5 nm at the mean pore diameter of the total meso-pore volume occupies 70% or more, or the volume of the pores within ±3 nm at the mean pore diameter of the total meso-pore volume occupies 55% or more.

The terminology "mean pore diameter" as used herein denotes the maximum peak diameter in the pore size distribution curve, and the terminology "total meso-pore volume" as used herein is intended to mean the total volume of the pores whose diameter ranges 2 to 100 nm.

The "mean pore diameter" and the "total meso-pore volume" are obtained from a pore size distribution curve prepared by the following method.

The meso-pore region of 3.5 nm or greater is measured chiefly by a mercury penetration method (ASTM D 4284-92: Standard Test Method for Determining Pore Volume Distribution of Catalysts by Mercury Intrusion Porosimetry). In calculating the pore size distribution from the pressure and the amount of intruded mercury, the surface tension and contact angle of mercury adopted were 480 d/cm and 140°, respectively. The term "pore size distribution curve" as used herein is a plot of pore diameter on the abscissa vs. differential cumulative pore volume distribution ($\Delta V/\Delta \log D$, wherein V is a pore volume, and D is a pore diameter) on the ordinate.

The region of 3.5 nm or smaller is evaluated based on a nitrogen adsorption isotherm as follows. An apparatus having a glass vacuum line equipped with a pressure sensor (MKS; Baratron 127AA; range: 1000 mmHg) and two control valves (MKS; 248A) is used, which is designed to introduce nitrogen gas to the vacuum line and the sample tube automatically. A glass sample tube containing a sample is connected to the vacuum line and evacuated to $10^{-4}$ mmHg at room temperature for about 2 hours. The sample tube is soaked in liquid nitrogen, and nitrogen gas is introduced into the vacuum line to a predetermined pressure. After the pressure becomes stationary, the control valve of the sample tube is opened. After the pressure becomes stable, the equilibrium pressure is recorded. The measurement is repeated for 16 to 18 points within an equilibrium pressure range of 0 to 760 mmHg. The nitrogen adsorption calculated from the equilibrium pressure and the pressure change is plotted to prepare a nitrogen adsorption isotherm. The thus prepared nitrogen adsorption isotherm is processed in accordance with Cranston-Incaly method to obtain a "pore size distribution curve".

How sharp the pore size distribution in the meso-pore region can be expressed by way of the "mean pore diameter" and "total meso-pore volume", i.e., in terms of how large the proportion (%) of the area within ±5 nm or ±3 nm of a mean pore diameter (of pores within a meso-pore region) is in the total meso-pore volume. The larger the proportion, the sharper the distribution; that is, the higher are concentrated the pore sizes in the vicinity of the mean pore diameter.

In this manner, the porous material according to the invention is quantitatively expressed and differentiated from others. The porous material of the invention is useful not only as a carrier for catalysts typically exemplified by a catalyst for purifying exhaust gases but as a catalyst for modifying fuel, various filters, a carrier for enzymes, an adsorbent, a filler, and so forth and is expected to exhibit excellent action and effect.

In particular, a titania porous material is known applicable to photo-catalysts and also observed to have bioaffinity.

Therefore, the titania porous material of the invention will find applications to biological materials taking advantage of the ability to immobilize or slowly release enzymes, etc. The zirconia porous material is also found to have bioaffinity and will find use as a biological material taking advantage of the ability to immobilize or slowly release enzymes, etc.

Of the second porous materials, the alumina porous material can comprise at least one of a rare earth element, an alkaline earth metal, and a group IV metal as an additive component in addition to alumina as a main component so as to have the heat resistance improved or various characteristics (such as acidity or basicity) modified, while retaining the above-described characteristics and effects. Additive components which can be added as a second or a third component include lanthanum oxide, magnesia, calcia, barium oxide, titania, silica, and zirconia.

The above-mentioned addition of the additive component as a second or third component also applies to the other second porous materials, i.e., zirconia, titania, magnesia, iron oxide and ceria porous materials. In this case, too, the heat resistance or other characteristics such as acidity or basicity can be controlled arbitrarily.

The second porous materials comprising such a second or a like component can also be expressed quantitatively and differentiated from others as described above. They are useful in the same applications as described above, being expected to exhibit excellent action and effect.

Of the second porous materials, the alumina porous material, especially La-doped alumina porous material, is highly desirable and promising as a catalyst for purifying exhaust gases because of its greatly improved heat resistance attributed to lanthanum in addition to the shape of the constituting particles and the pore structure as well as the freedom of controlling the acidity or basicity. Further, Ti-doped alumina porous material is also promising as a catalyst for purifying exhaust gases in view of the shape of constituent particles, the pore structure, and the desirably modified acidity or basicity attributed to titanium added.

Use of the porous material according to the present invention is not confined to the above-described applications and can be a useful material in reaction, separation, adsorption, desorption or the like operation in which molecules participate for the following reasons.

When molecules diffuse through meso-pores, the diffusion is governed by Kundsen's diffusion, in which molecules flow while colliding with the wall of the pores. Where the pore size is greater than a meso-pore region, molecular collision among themselves is predominant over the collision with the wall. Moreover, since at least a part of the pores are connected three-dimensionally, and the thus formed passages form a random three-dimensional network structure, the molecules passing through the pores can react effectively. Furthermore, the porous material of the invention has an arbitrarily controlled mean pore size and a sharp pore size distribution, which makes the porous material the fittest to particular uses.

The process of producing the porous material according to the present invention comprises the steps of:
(1) preparing a system capable of becoming an oxide on thermal decomposition,
(2) aging the system at or above room temperature for a prescribed period of time to form a precursor, and
(3) calcining the precursor.

Step (1):

The system prepared in step (1), which is capable of becoming an oxide on thermal decomposition, comprises a substance capable of becoming an oxide on thermal decomposition and a solvent. The substance is preferably solvated with the solvent. The solvent preferably includes water, a monohydric alcohol, a dihydric alcohol, a trihydric alcohol, and a mixture of one or more thereof. Water, amonohydric alcohol or a mixture thereof is still preferred. Water is particularly preferred. The monohydric alcohol includes methanol, ethanol and propanol; the dihydric alcohol includes ethylene glycol, propylene glycol and a polymer thereof; and the trihydric alcohol includes glycerol.

The substance to be solvated, i.e., the substance capable of becoming an oxide on thermal decomposition, includes at least one of a hydroxide of aluminum, zirconium, titanium, magnesium, iron or cerium and a salt of aluminum, zirconium, titanium, magnesium, iron or cerium and a system comprising the above-described hydroxide and/or salt as a main component and, as an additive component, at least one of a rare earth element, an alkaline earth metal, and a group IV metal.

It is preferred for the hydroxide or the salt (e.g., a sulfate, a nitrate, etc.) be immersed in a solvent. The system immersed in the solvent is preferably a precipitate formed from an aluminum salt, a zirconium salt, a titanium salt, a magnesium salt, an iron salt, or a cerium salt.

The precipitate is formed by, for example, adjusting the pH of an aqueous solution of the above-described salt by addition of a neutralizing agent such as ammonia. The pH value depends on the kind of the starting material or the neutralizing agent. As an illustrative example, in case where an aluminum sulfate aqueous solution is neutralized with ammonia (solution), the pH is preferably adjusted between 3 and 4.5 in the preparation of the first porous material and 8 or above in the preparation of the second porous material.

Where it is desired to obtain a second porous material having improved heat resistance or other controlled characteristics (for example, acidity or basicity), at least one of a rare earth element, an alkaline earth metal, and a group IV metal can be added as an additive component in step (1). More specifically, lanthanum oxide, magnesia, calcia, barium oxide, titania, silica, zirconia, and the like can be added.

Step (2)—Aging Step:

This step is to hold (age) the system prepared in the preceding step at room temperature (10° C.) or higher temperature for a prescribed period of time (e.g., 0.5 to 200 hours) to produce a precursor. Step (2) is preferably carried out in saturated vapor or nearly saturated vapor. The saturated or nearly saturated vapor is preferably steam. The temperature of the steam is desirably 200° C. or lower, more desirably 80 to 150° C., most desirably 100 to 130° C. The aging time is usually 0.5 to 200 hours. The aging time and temperature are correlated to each other. For example, step (2) is completed in 0.5 to 10 hours at 120° C.; 2 to 30 hours at 80° C.; and 5 to 200 hours at 25° C. To prolong the aging time over 200 hours technically produces some effect but is economically unreasonable.

Aging of step (2) is remarkably effective in obtaining a precursor of the porous material featuring the invention which is characterized by comprising particles without substantial fibrous structure and having pores, the pores having a mean pore diameter in a meso-pore region, sharp pore size distribution, and at least a part of the pores being connected three-dimensionally to form a three-dimensional network structure with random passages.

The aging is also contributory to heat resistance of alumina. From the aspect of thermal stability of alumina crystal phases, for alumina to have heat resistance means that it keeps a γ-phase up to a high temperature while hardly producing an α-phase. If the aging temperature is lower than room temperature (lower than 10° C.), particularly in case where a second component is added for improving heat resistance, it is difficult to achieve uniformity of the second component in the precursor in a short time, which may result in reduction of heat resistance. If, on the other hand, the aging temperature exceeds 200° C., the precursor is stable up to high temperatures and hardly decomposes, encountering difficulty in forming controlled pores in the state of γ-alumina. This is also disadvantageous for the economical consideration.

Step (3):

Step (3) is a step of calcining the precursor obtained in the aging step. More particularly, it is a step of removing the solvent component while maintaining the grain arrangement in the precursor. While varying depending on the kind of the material, the calcining temperature usually ranges from 300 to 1200° C. and, for an alumina porous material, from 400 to 1200° C.

The process, which basically comprises steps (1) to (3), can further comprise a step of separation, washing or drying between steps (2) and (3), if desired.

The step of separation following the aging step is to separate the precursor from the solvent, which can be effected by, for example, filtration or centrifugation. It should be noted that such a separating operation as may destroy the grain arrangement of the precursor is unfavorable. As the step of separation aims at improvement in efficiency of the subsequent step of calcining, this step may be omitted.

The step of washing following the aging step is for removal of unnecessary components such as by-produced salts by washing. Note that such a washing operation as may destroy the grain arrangement of the precursor should be avoided. This step can be omitted in case where the by-produced salts and the like could be removed on calcination in step (3).

The step of drying, which can follow the aging step and may also be omitted, is a step of drying the solution containing the precursor as obtained in the aging step, or the precursor as separated in the separation step, or the precursor as washed in the washing step, for example at 80° C. for 24 hours or longer.

According to the process of the invention, the aging step for producing the precursor is combined with the calcining step for solvent removal while retaining the grain arrangement of the precursor having been made uniform during the aging. The combination produces the remarkable actions and effects that the resulting porous material is characterized in that (1) the mean pore diameter is in a meso-pore region, (2) the pores have a sharp size distribution, (3) at least a part of the pores are connected three-dimensionally to form a three-dimensional network structure with random passages, and (4) the porous material has substantially no fibrous structure.

The actions and effects of the process will be explained, taking for instance an alumina porous material having a spongy structure (the first porous material of the invention) which is prepared by adjusting an aluminum sulfate aqueous solution to pH 3.8 with ammonia (solution). In this particular case, aging gives coarse crystals of ammonium alum [$NH_4Al(SO_4)_2 \cdot 12H_2O$] as a uniform precursor. Being uniform, the precursor undergoes uniform decomposition and release of water and ammonium sulfate (i.e., decomposition of alum [$Al_2(SO_4)_3 \cdot 12H_2O$] or an intermediate [$NH_4Al_3(SO_4)_2(OH)_6$]) on calcination. When calcined at 800° C., the precursor thus gives an amorphous porous material having a spongy structure while forming meso-pores having a mean pore diameter, e.g., of 9.3 nm (see Example 1 hereinafter described). When calcined at 900° C. or 1000° C., the amorphous state having a spongy structure uniformly generates nuclei of γ-alumina, which show crystal growth to become grains of uniform size while forming meso-pores having a mean pore diameter, e.g., of 14.9 nm or 16.7 nm, respectively, among them to provide the second porous material of the invention (see Examples 2-1).

The above-described actions and effects will further be defined, taking for instance an alumina porous material composed of $Al_2O_3$ and $La_2O_3$ (1:0.025 by mole) which is prepared by using aluminum sulfate and lanthanum nitrate as starting materials and adjusting the pH to 8.8 with ammonia (solution). In this case, aging results in formation of uniform boehmite gel as a precursor. Being uniform, the precursor undergoes uniform decomposition and release of water (i.e., decomposition of boehmite) on calcination to give alumina crystals of uniform size while forming meso-pores having a mean pore diameter, e.g., of 4.3 nm, 7.5 nm, 12.2 nm, 15.1 nm, 18.0 nm, 21.5 nm or 26.0 nm (see Example 2-8). The resulting alumina porous material is the second porous material of the invention.

A preferred embodiment for obtaining each of the first and the second porous materials is described below only for illustrative purposes but not for limitation.

The first porous material is preferably prepared by adjusting the pH of an aluminum salt aqueous solution to 3 to 4.5 to allow at least a part of the aluminum component to precipitate, aging the aqueous solution containing the precipitate in saturated vapor or nearly saturated vapor for a prescribed period of time to form a precursor, and calcining the precursor to remove the water content while retaining the grain arrangement of the precursor thereby making amorphous.

The second porous material is preferably prepared by aging a system capable of becoming an oxide on thermal decomposition in saturated vapor or nearly saturated vapor for a prescribed time to form a precursor and calcining the precursor to remove the solvent component while retaining the grain arrangement of the precursor thereby converting the precursor to the corresponding oxide.

The catalyst for purifying exhaust gases according to the invention is, in its first aspect, a catalyst comprising a carrier and a noble metal supported on the carrier, at least a part of the carrier being the porous material of the invention (inclusive of the first and the second aspects of the porous material) In this catalyst, the noble metal is concentrated in the vicinity of the carrier surface. Thus, a well-known method of depositing a noble metal on a carrier can be applied to the porous material of the invention to have the noble metal supported on the surface of the porous material in a high concentration.

The noble metal which can be used in the first catalyst includes platinum (Pt), rhodium (Rh), palladium (Pd), iridium (Ir), ruthenium (Ru), silver (Ag), and gold (Au). The noble metal can be supported on the carrier comprising the porous material of the invention by a method comprising having the carrier directly adsorb, or impregnated with, a noble metal compound, such as a nitrate, an acetate or a chloride, or a method comprising slurring the carrier either alone or in combination with promoters or other carriers, applying the slurry to a monolithic substrate, and having the noble metal compound supported thereon by adsorption or impregnation.

The amount of the noble metal to be supported preferably ranges 0.1 to 40 g, particularly 0.5 to 20 g, per 100 g of the carrier irrespective of the kind. Where the noble metal is applied to a coated monolithic substrate, a preferred coating weight of the noble metal is 0.1 to 30 g, particularly 0.3 to 15 g, per liter of the monolithic substrate. The activity is saturated at 30 g/l so that a higher amount brings about no further improvement, and the excess is useless. With less than 0.1 g/l of the noble metal, the activity is insubstantial for practical use.

The catalyst for purifying exhaust gases thus prepared possesses the characteristics of the porous material according to the invention. Hence, grain growth of the noble metal in high temperature can be inhibited thereby minimizing deterioration of catalytic activity, and oxidation/reduction reactions for exhaust gas purification proceed efficiently in the pores. Since the pores, in which the noble metal is held, have a mean pore diameter in the meso-pore region, the noble metal can be supported stably and in a highly disperse state. The sharpness of the pore size distribution further secures uniformity of the supported state of the noble metal. As a result, starting points of noble metal grain growth hardly generate in high temperature, and grain growth of the noble metal in high temperature can be suppressed. Deterioration of catalytic activity can thus be inhibited.

As previously stated, when molecules diffuse through meso-pores, the diffusion is governed by Kundsen's diffusion, in which molecules flow while colliding with the wall of the pores. Where the pore size is greater than a meso-pore region, molecular collision among themselves is predominant over the collision with the wall. In this connection, since at least a part of the meso-pores are connected three-dimensionally to form a three-dimensional network structure with random passages, unburnt HC, CO, $NO_x$, etc. in an exhaust gas passing through the pores are diffused throughout the catalyst while reacting efficiently with the noble metal supported on the wall of the pores.

Additionally, since the porous material has substantially no fibrous structure, the noble metal particles hardly agglomerate and are hindered from grain growth in high temperature thereby to provide a catalyst for purifying exhaust gases excellent in high-temperature durability. If the particles making up the carrier should be fibrous, there is a certain crystal plane that is along the fiber direction. As a result, a noble metal, even though supported in a highly disperse state, will be supported on the same crystal plane in an increased proportion. The noble metal particles supported on the same crystal plane are more apt to agglomerate than those supported on different crystal planes.

Compared with such a fibrous carrier, since the second porous material of the invention comprises the particles having an aspect ratio of 3 or smaller, the crystal planes are limited by the particle size, and the crystal planes on which a noble metal is supported are thereby limited. As a result, the noble metal particles hardly agglomerate among themselves, and grain growth of the noble metal in high temperature can be suppressed.

In case where the particles constituting a carrier is amorphous, lack of a crystal plane (or, which a noble metal can be held) allows noble metal particles to move easily and agglomerate on the surface of the carrier and agglomerate even though the particles could be supported in a highly disperse state. In the case of the first porous material of the invention, on the contrary, although it is made up of amorphous particles, it has a spongy structure with pores being made of recesses, so that noble metal particles can be held in the pores stably, being prevented from agglomerating among themselves and growing in grains in high temperature.

The catalyst for purifying exhaust gases according to the invention is, in its second aspect, a catalyst comprising a carrier, an $NO_x$ storage component comprising at least one of an alkali metal, an alkaline earth metal, and a rare earth element that is supported on the carrier, and a noble metal supported on the carrier, in which at least a part of the carrier comprises the porous material of the invention (the catalyst according to the second aspect will hereinafter be referred to as the second catalyst).

The carrier used in the second catalyst comprises a porous material which is characterized by (1) having pores whose mean pore diameter is in a range of from 2 to 100 nm, at least a part of which are connected three-dimensionally to form a three-dimensional network structure with random passages, and (2) containing substantially no fibrous structure.

The pores of the carrier should have a mean pore diameter of 2 nm or greater so as to hold the $NO_x$ storage component and the noble metal with certainty and to take exhaust gas components into the inside of the catalyst for certain without suffering from clogging, thereby securing the oxidation-reduction reactions. Further, the mean pore diameter should be 100 nm or smaller so as to block grain growth of sulfites or sulfates generated by the reaction between $SO_x$ in an exhaust gas and the $NO_x$ storage component and also to suppress grain growth of the noble metal that may occur particularly in a high temperature exhaust gas.

Since at least a part of the pores are connected three-dimensionally to form a three-dimensional network structure with random passages, the noble metal having catalytic activity can be supported on the carrier stably in a highly disperse state.

In case a porous material should have a fibrous structure, the noble metal is apt to be supported on a crystal plane that is present along the fiber direction. The noble metal grains on a fibrous porous material, even if highly dispersed, tend to grow in high temperature. Since the porous material used as a carrier of the second catalyst has substantially no fibrous structure, grain growth of the noble metal attributed to a fibrous structure does not take place so that the noble metal can be protected from reduction of activity even in high temperature. As previously defined, "to have substantially no fibrous structure" means to have no such a structure that fibrous particles having an aspect ratio greater than 3 are aggregated to form pores among the particles.

By use of the above-described porous material as a carrier, grain growth of sulfites or sulfates generated by the reaction between $SO_x$ and an $NO_x$ storage component and/or grain growth of the noble metal which occurs particularly in a high-temperature exhaust gas can be suppressed while certainly maintaining the $NO_x$ storage ability of the $NO_x$ storage component and the catalytic activity of the noble metal. Thus, the carrier is capable of imparting high $NO_x$ removal performance, high sulfur poisoning resistance, and satisfactory high-temperature durability to the catalyst.

While any porous material having the above-mentioned constitution can be used as a carrier for the catalyst of the invention with no particular restrictions, it is preferred to use the second porous material shown in FIG. 1B, i.e., the porous material made of particles 21 having an aspect ratio of 3 or less aggregated together to form pores 22 among them. Since the particles 21 shown in FIG. 1B have an aspect ratio of 3 or less, the shape of the interstices formed by aggregation of the particles 21 is such that can stably hold the noble metal having catalytic activity in a highly disperse state to impart high $NO_x$ removing ability to the catalyst for purifying exhaust gases.

The particles 21 are preferably crystal grains of an anoxide. Because of crystal planes present on the carrier, the noble metal hardly moves on the carrier surface and is therefore inhibited from agglomerating in high temperature. As a result, high $NO_x$ removing ability can be imparted to the catalyst for purifying exhaust gases.

The oxide preferably includes an oxide and/or a complex oxide composed of at least one of alumina, zirconia, titania, magnesia, iron oxide, and ceria. For example, the oxide may be a complex oxide, such as spinel ($MgAl_2O_4$).

It is a highly preferred embodiment that at least one of a rare earth element, an alkaline earth metal, and a group IV element is added as an additive component to the porous material having the structure shown in FIG. 1B (i.e., the second porous material) to control the heat resistance of the porous material and other various characteristics, such as the shape of the particles constituting the porous material and the pore structure. Lanthanum is a particularly preferred rare earth element to be added, which can improve the heat resistance of the porous material to impart high heat resistance to the catalyst for purifying exhaust gases.

While the porous material to be used as a carrier for the second catalyst has been described chiefly with reference to FIG. 1B, other porous materials could be used as long as they satisfy the conditions that (1) the pores have a mean pore diameter in a range of from 2 to 100 nm, and at least a part of the pores are connected three-dimensionally to form a three-dimensional network structure with random passages and (2) the porous material comprises particles without substantial fibrous structure. For example, a porous material having the structure shown in FIG. 1A (i.e., the first porous material) can be used as well. The first porous material shown in FIG. 1A is an amorphous alumina porous material having a spongy structure with pores 12.

Although the first porous material is amorphous, it has a spongy structure with pores being made of recesses in which noble metal particles can exist stably. Accordingly, the first porous material used as a carrier suppresses grain growth of the noble metal particles as may be observed in a high-temperature exhaust gas thereby imparting high $NO_x$ removing ability to the catalyst for purifying exhaust gases.

While the structure of the porous materials useful as a carrier in the second catalyst of the invention has been described by way of FIGS. 1A and 1B, whichever structure the porous material may have, it is desirable that the volume of the pores whose diameter is in a range of from 2 to 20 nm in the total volume of the pores whose diameter is in a range of from 2 to 100 nm occupies 70% or more. In this preferred embodiment, grain growth of sulfites or sulfates produced by the reaction between $SO_x$ present in an exhaust gas and the $NO_x$ storage component is impeded with more certainty thereby minimizing reduction of the $NO_x$ storage ability of the $NO_x$ storage component. Further, grain growth of the noble metal which may occur particularly in a high-temperature exhaust gas is suppressed with more certainty thereby minimizing reduction of the catalytic activity of the noble metal. There is thus obtained a catalyst for purifying exhaust gases exhibiting high $NO_x$ removal performance, high resistance to sulfur poisoning, and satisfactory high-temperature durability.

The porous material which can be used as a carrier of the second catalyst is as described previously.

The carrier used in the second catalyst contains an $NO_x$ storage component for storing $NO_x$ under lean conditions. The $NO_x$ storage component comprises at least one of an alkali metal, an alkaline earth metal, and a rare earth element. An alkali metal, such as lithium, sodium, potassium or cesium, is preferred. Useful alkaline earth metals include barium, magnesium, calcium, and strontium. Useful rare earth elements include scandiumn, yttrium, lanthanum, cerium, praseodymium, and neodymium.

The $NO_x$ storage component is preferably supported in an amount of 0.05 to 1.0 mol, particularly 0.1 to 0.5 mol, per 100 g of the carrier. If the amount of the $NO_x$ storage component is less than 0.05 mol, the $NO_x$ adsorption may be insufficient. If present in amounts exceeding 1.0 mol, the $NO_x$ storage component tends to clog the pores of the carrier to reduce the surface area, resulting in reduction of activity.

The noble metal which is supported on the carrier of the second catalyst serves to catalyze oxidation and reduction reactions. Suitable noble metals include platinum (Pt), rhodium (Rh), palladium (Pd), gold (Au), and silver (Ag). Platinum is particularly desirable. These noble metals can be used either individually or as a combination of two or more thereof.

Irrespective of the kind of the noble metal, the amount of the noble metal to be supported preferably ranges 0.2 to 40 g, particularly 1 to 20 g, per 100 g of the carrier, which corresponds to 0.1 to 20 g or 0.5 to 10 g, respectively, per liter of the whole catalyst. Higher amounts than 20 g bring about no further improvement, and the excess is useless. With less than 0.1 g of the noble metal, the activity is insubstantial for practical use.

The second catalyst for purifying exhaust gases according to the invention is produced by having an $NO_x$ storage component and a noble metal component (e.g., a chloride, an acetate, a nitrite, etc. of a noble metal) supported on the above-described porous material in a known manner, such as a general method used for a noble metal-on-carrier, a spray method or a mixed slurry method, and the like.

The method for purifying exhaust gases according to the present invention comprises setting the aforementioned second catalyst of the invention in an oxygen-excess exhaust gas to make the $NO_x$ storage component store the $NO_x$ contained in the exhaust gas, making the $NO_x$ storage component release the stored $NO_x$ on periodically shifting the air/fuel ratio of the exhaust gas from a stoichiometric point to a fuel excess side, and reducing the thus released $NO_x$.

Where an oxygen-excess exhaust gas contains sulfur, it has been a generally encountered phenomenon that an $NO_x$ storage component is converted to its sulfite or sulfate and loses the $NO_x$ storing ability. According to the method of the invention, upon the exhaust gas being shifted to a fuel-rich condition, decomposition of the sulfite or sulfate of the $NO_x$ storage component is accelerated, and the $NO_x$ storing ability can be restored. Owing to these actions and effects, the exhaust gas purification method of the invention accomplishes high $NO_x$ removal while maintaining the $NO_x$ storing ability of the $NO_x$ storage component and the catalytic activity of the noble metal and protecting the catalyst against sulfur poisoning.

The present invention will now be illustrated in greater detail with reference to Examples in view of Comparative Examples, but it should be understood that the invention is not construed as being limited thereto. In Examples and Comparative Examples, where aging was carried out at 100° C. or higher, the pressure given in the parentheses following a prescribed aging temperature indicates the saturated steam pressure at that temperature.

EXAMPLE 1

Preparation of First Porous Material:

In 1 liter of ion-exchange water was dissolved 0.21 mol of aluminum sulfate to prepare a starting aqueous solution. The aqueous solution was adjusted to pH 3.8 by addition of 48 g of 25% ammonia solution to form a precipitate. The aqueous solution containing a precipitate was aged at 120° C. (2 atm.) for 2 hours, washed, dried, and calcined at 800° C. in the atmosphere for 5 hours. The resulting alumina porous material (hereinafter "the 800° C. calcined product") was found amorphous.

The pore size distribution of the 800° C. calcined product was measured with PMI Porosimeter supplied by PMI. From the prepared distribution curve were obtained the mean pore diameter (the peak diameter) and the volume of the pores within ±5 nm or ±3 nm at the mean pore diameter of the total meso-pore volume (the volume of pores in a region of 2 to 100 nm). The results obtained are shown in Table 1.

Figure 2:
FIG. 2 is a TEM image of the alumina porous material (calcined at 800° C.) obtained in Example 1.

FIG. 2 is a TEM image of the 800° C. calcined product, in which 1.5 cm corresponds to 50 nm. The TEM image proves that the amorphous alumina porous material obtained by calcination at 800° C. has a special spongy structure with uniform pores.

EXAMPLE 2

Examples 2-1 to 2-18 demonstrate alumina porous materials among the second porous materials.

EXAMPLE 2-1

Alumina porous materials were prepared in the same manner as in Example 1, except that the calcining temperature was changed from 800° C. to 900° C. or 1000° C. Both porous materials obtained (900° C. calcined product and 1000° C. calcined product) were found to be γ-alumina.

The mean pore diameter and the volume of the pores within ±5 nm or ±3 nm at the mean pore diameter of the total meso-pore volume were determined in the same manner as in Example 1. The results obtained are shown in Table 1. A TEM image was taken of the resulting alumina porous materials, and the aspect ratio of arbitrarily selected 50 particles constituting each porous material was measured. Forty-eight particles out of fifty (96%) had an aspect ratio of 3 or less. It was also ascertained by the TEM image observation that the porous materials were sparse aggregates of particles having an aspect ratio of 3 or less with meso-pores among the particles.

COMPARATIVE EXAMPLE 1

Assuming that aluminum sulfate used as a starting material in Examples 1 and 2-1 was once converted to alum during aging, ammonium alum aqueous solution was used here as a starting aqueous solution for comparison.

In 49 g of water was dissolved 8.9 g of ammonium alum (reagent grade) to prepare a starting aqueous solution. The aqueous solution was aged at 120° C. (2 atm.) for 2 hours in the same manner as in Examples 1 and 2-1. Without washing, the aged product was calcined in the atmosphere for 5 hours at 800° C. or 1000° C. The mean pore diameter and the volume of the pores within ±5 nm and ±3 nm at the mean pore diameter of the total pore volume were obtained in the same manner as in Example 1. The results are shown in Table 1.

TABLE 1

| | Preparation Conditions | | | | Physical Properties of Porous Material | | | |
|---|---|---|---|---|---|---|---|---|
| | Starting Aqueous Solution | Precipitation | Aging | Washing | Calcining Temp. (° C. × 5 hrs) | Crystal Phase | Mean Pore Diameter (nm) | ±5 nm* (%) | ±3 nm** (%) |
| Example 1 | aluminum sulfate: 0.21 mol | 25% ammonia solution: 48 g; pH: 3.8 | 120° C. (2 atm.) × 2 hrs | done | 800 | amorphous | 9.3 | 99 | 90 |
| Example 2-1 | do. | do. | do. | done | 900 | γ-phase | 14.9 | 94 | 87 |
| | | | | | 1000 | γ-phase | 16.7 | 95 | 86 |
| Compara. Example 1 | ammonium alum: 8.9 g; | — | do. | undone | 800 | γ-phase (+aluminum sulfate) | 16.9 | 65 | 47 |
| | | | | | 1000 | γ-phase | 13.6 | 63 | 54 |

Note: *The volume of the pores within ±5 nm at the mean pore diameter of the total meso-pore volume (%).
**The volume of the pores within ±3 nm at the mean pore diameter of the total meso-pore volume (%).

It is seen from Table 1 that the alumina porous material of Example 1, which was obtained by aging followed by calcination at 800° C., has a mean pore diameter in a meso-pore region with a sharp pore size distribution. Additionally, the TEM image shown in FIG. 2 demonstrates the specific spongy structure with uniform pores.

On the other hand, the alumina porous materials of Example 2-1, which were obtained by calcination at higher temperatures (900° C. and 1000° C.), are ones resulting from growth of γ-alumina grains of uniform size out of the amorphous and spongy form while making uniform pores among them. The pores also have a mean pore diameter in the meso-pore region and a sharp size distribution as is seen from Table 1. As stated previously, the TEM image observation on the 900° C. calcined product and the 1000° C. calcined product revealed that the γ-alumina grains making up them have an aspect ratio of 3 or smaller.

In contrast, the alumina precursor of Comparative Example 1 did not become amorphous on calcination. The 800° C. calcined product was γ-alumina containing undecomposed aluminum sulfate, and its TEM image revealed no spongy structure as was observed with the 800° C. calcined product of Example 1 (the first porous material). Under the TEM image observation, the particles constituting the 1000° C. calcined product of Comparative Example 1, which was also γ-alumina, could not be regarded uniform in shape and were utterly different in shape from those of Example 2-1 (the second porous material). As is apparent from Table 1, neither of the 800° C. calcined product and the 1000° C. calcined product of Comparative Example 1 showed as sharp a pore size distribution as in Examples 1 and 2-1.

EXAMPLE 2—2

In 1 liter of ion-exchange water was dissolved 0.21 mol of aluminum sulfate to prepare a starting aqueous solution. The aqueous solution was adjusted to pH 8.8 by addition of 85.7 g of 25% ammonia solution to form a precipitate. The aqueous solution containing a precipitate was aged at 120° C. (2 atm.) for 2 hours, washed, dried, and calcined in the atmosphere at 800° C., 900° C. or 1000° C. for 5 hours. The alumina porous materials obtained, i.e., the 800° C. calcined product and the 900° C. calcined product were found to be γ-alumina, and the 1000° C. calcined product was γ-alumina containing an α-alumina as a secondary phase (the term "secondary phase" as used herein means a crystal phase other than the predominant crystal phase, hereinafter the same).

The pore size distribution curve of each of the alumina porous materials was prepared to obtain the mean pore diameter (the peak diameter) and the volume of the pores within ±5 nm or ±3 nm at the mean pore diameter of the total meso-pore volume (the volume of pores in a region of 2 to 100 nm) in the same manner as in Example 1. The results obtained are shown in Table 2.

A TEM image was taken of the resulting alumina porous materials, and the aspect ratio of arbitrarily selected 50 particles per porous material was measured. Forty-eight particles out of fifty (96%) had an aspect ratio of 3 or less. Further, the TEM image demonstrated the porous materials to be a sparse aggregate of particles having an aspect ratio of 3 or less with meso-pores among the particles.

EXAMPLE 2-3

Alumina porous materials were prepared in the same manner as in Example 2—2, except that the aging was conducted at 150° C. (5 atm.) for 2 hours, followed by calcination at 800° C. or 1000° C. The 800° C. calcined product was γ-alumina, and the 1000° C. calcined product was γ-alumina containing an α-alumina as a secondary phase.

The mean pore diameter and the volume of the pores within ±5 nm or ±3 nm at the mean pore diameter of the total meso-pore volume were obtained in the same manner as in Example 1. The results obtained are shown in Table 2. Further, the TEM image observation proved that the porous materials were sparse aggregates of particles having an aspect ratio of 3 or less with meso-pores among the particles.

EXAMPLE 2-4

Alumina porous materials were prepared in the same manner as in Example 2—2, except that the aging was effected at 180° C. (10 atm.) for 2 hours, followed by calcination at 800° C. or 1000° C. The 800° C. calcined product was boehmite (i.e., precursor), and the 1000° C. calcined product was γ-alumina containing an α-alumina as a secondary phase.

The mean pore diameter and the volume of the pores within ±5 nm or ±3 nm at the mean pore diameter of the total meso-pore volume were obtained in the same manner as in Example 1. The results obtained are shown in Table 2. TEM image observation proved that the 1000° C. calcined product was a sparse aggregates of particles having an aspect ratio of 3 or less with meso-pores among the particles.

It is recognized from comparison between Examples 2-4 and 2—2 that the decomposition temperature of boehmite (precursor of alumina porous material) tends to rise as the aging conditions become stricter. Taking the cost of firing into consideration, it is seen that aging conditions stricter than those of Example 2-4 are not favorable.

EXAMPLE 2-5

Alumina porous materials were prepared in the same manner as in Example 2—2, except that the aluminum sulfate (0.21 mol) was replaced with 0.42 mol of aluminum nitrate, and the aqueous solution was adjusted to pH 8.5 for precipitation. The calcination temperature was 800° C. or 900° C. Both the 800° C. calcined product and the 900° C. calcined product were γ-alumina.

The mean pore diameter and the volume of the pores within ±5 nm or ±3 nm at the mean pore diameter of the total meso-pore volume were obtained in the same manner as in Example 1. The results obtained are shown in Table 2. Further, the TEM image demonstrated the porous materials to be sparse aggregates of particles having an aspect ratio of 3 or less with meso-pores among the particles.

EXAMPLE 2-7

Alumina porous materials were prepared in the same manner as in Example 2-6, except that the aging was carried out at 80° C. (1 atm.) for 2 hours. The 800° C. calcined product was γ-alumina, and the 1050° C. calcined product was γ,θ-mixed alumina with α-alumina and lanthanum aluminate (secondary phase).

The mean pore diameter and the volume of the pores within ±5 nm or ±3 nm at the mean pore diameter of the total meso-pore volume were obtained in the same manner as in Example 1. The results obtained are shown in Table 3. The TEM image observation revealed that the porous materials were sparse aggregates of particles having an aspect ratio of 3 or less with meso-pores among the particles.

EXAMPLE 2-8

Alumina porous materials were prepared in the same manner as in Example 2-6, except that the aging was at 120° C. (2 atm.) for 2 hours, followed by calcination at 200° C., 600° C., 800° C., 900° C., 1000° C., 1050° C., 1100° C., or 1200° C. The 200° C. calcined product was boehmite (i.e., precursor), the 600° to 1050° C. calcined products were

TABLE 2

| | Preparation Conditions | | | | | Physical Properties of Porous Material | | |
| --- | --- | --- | --- | --- | --- | --- | --- | --- |
| | Starting Aqueous Solution | Precipitation | Aging | Washing | Calcining Temp. (° C. × 5 hrs) | Crystal Phase (Secondary Phase) | Mean Pore Diameter (nm) | ±5 nm[*1] (%) | ±3 nm[*2] (%) |
| Example 2-2 | aluminum sulfate: 0.21 mol | 25% ammonia solution: 85.7 g; pH; 8.8 | 120° C. (2 atm ) × 2 hrs | done | 800 900 1000 | γ-phase γ-phase γ-phase (α-phase) | 8.1 13.9 14.2 | 93 88 85 | 89 82 80 |
| Example 2-3 | do. | do. | 150° C. (5 atm.) × 2 hrs | done | 800 1000 | γ-phase γ-phase (α-phase) | 7.3 15.8 | 83 78 | 68 62 |
| Example 2-4 | do. | do. | 180° C. (10 atm.) × 2 hrs | done | 800 1000 | boehmite[*3] γ-phase (α-phase) | — 15.2 | — 70 | — 59 |
| Example 2-5 | aluminum nitrate: 0.42 mol | 25% ammonia solution: 85.7 g; pH: 8.5 | 120° C. (2 atm.) × 2 hrs | done | 800 900 | γ-phase γ-phase | 8.1 11.9 | 97 92 | 93 88 |

Note: [*1]The volume of the pores within ±5 nm at the mean pore diameter of the total meso-pore volume (%).
[*2]The volume of the pores within ±3 nm at the mean pore diameter of the total meso-pore volume (%).
[*3]Boehmite is not porous material, but precursor.

EXAMPLE 2-6

In 1 liter of water were dissolved 0.2 mol of aluminum sulfate and 0.01 mol of lanthanum nitrate to prepare a starting aqueous solution. The aqueous solution was adjusted to pH 8.8. by addition of 83.6 g of 25% ammonia solution to obtain a precipitate. The aqueous solution containing a precipitate was aged at 30° C. (1 atm.) for 24 hours, washed, dried, and calcined in the atmosphere at 800° C. or 1050° C. for 5 hours to obtain alumina porous materials. The 800° C. calcined products was γ-alumina, and the 1050° C. calcined product was γ,θ-mixed alumina containing an α-alumina and lanthanum aluminate (secondary phase).

The mean pore diameter and the volume of the pores within ±5 nm or ±3 nm at the mean pore diameter of the total meso-pore volume were obtained in the same manner as in Example 1. The results obtained are shown in Table 3. The TEM image observation ascertained that the porous materials were sparse aggregates of particles having an aspect ratio of 3 or less with meso-pores among the particles.

γ-alumina, the 1100° C. calcined product was γ-alumina with a θ-aluminia as a secondary phase, and the 1200° C. calcined product was θ-alumina containing an α-alumina as a secondary phase.

Figure 3:
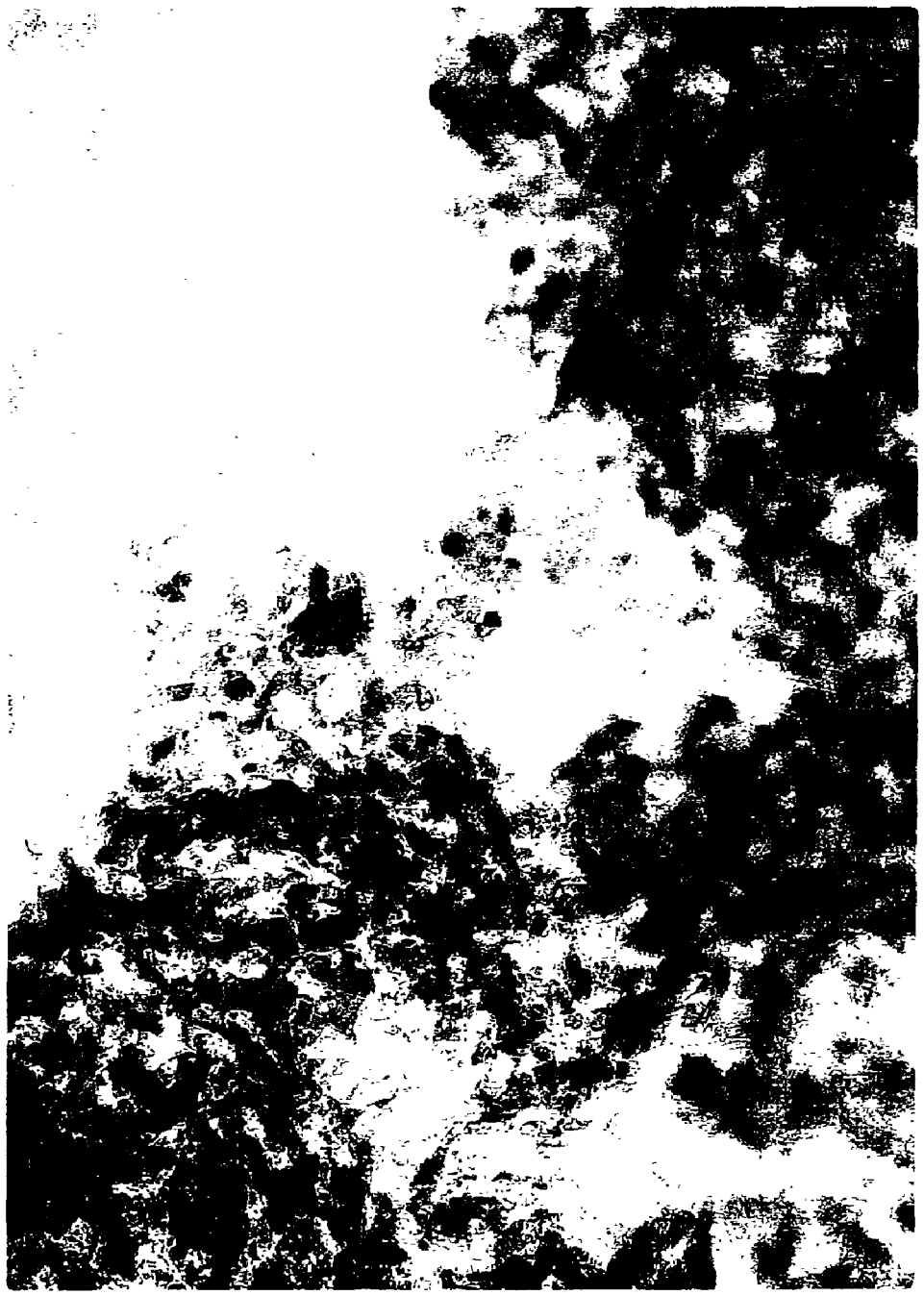
FIG. 3 is a TEM image of the La-added alumina porous material (calcined at 1000° C.) obtained in Example 2-8.

The mean pore diameter and the volume of the pores within ±5 nm or ±3 nm at the mean pore diameter of the total meso-pore volume were obtained in the same manner as in Example 1. The results obtained are shown in Table 3. A TEM image of the 1000° C. calcined product obtained in Example 2-8 is shown in FIG. 3, in which 1.5 cm corresponds to 50 nm. Boehmite, the precursor (200° C. calcined product), had a smooth surface with no porosity but decomposed to γ-alumina on calcining at 1000° C. to give a sparse aggregate of particles having an aspect ratio of 3 or less with meso-pores among the particles as shown in the TEM image.

On examining Examples 2-6, 2-7, and 2-8, it is understood that distribution of lanthanum, an additive component, and the grain arrangement of the precursor are getting more uniform thereby bringing about improvements on heat resistance and pore size distribution according as the aging conditions are made stricter (see Table 3 below). With these facts taken into consideration, it can be seen that the aging temperature is preferably 100° C. or higher.

EXAMPLE 2-9

Alumina porous materials were prepared in the same manner as in Example 2-8, except for changing the amounts of lanthanum nitrate and 25% ammonia solution to 0.006 mol and 82.8 g, respectively (pH adjusted to 8.8). The calcining temperature was 800° C., 1000° C. or 1200° C. The resulting 800° C. calcined product and 1000° C. calcined product were γ-alumina, and the 1200° C. calcined product was α,θ-mixed alumina.

The mean pore diameter and the volume of the pores within ±5 nm or ±3 nm at the mean pore diameter of the total meso-pore volume were obtained in the same manner as in Example 1. The results obtained are shown in Table 3. Further, the TEM image observation shows that the porous materials were sparse aggregates of particles having an aspect ratio of 3 or less with meso-pores among the particles.

As shown in Table 3, Example 2-8 shows retardation of modification to the α-phase, which is a high-temperature phase of alumina, as compared with Example 2-9.

temperature was 800° C., 1000° C. or 1200° C. The resulting 800° C. calcined product and 1000° C. calcined product were γ-alumina, and the 1200° C. calcined product was θ-alumina containing lanthanum aluminate as a secondary phase.

The mean pore diameter and the volume of the pores within ±5 nm or ±3 nm at the mean pore diameter of the total meso-pore volume were obtained in the same manner as in Example 1. The results obtained are shown in Table 3. Further, the TEM image observation proved that the porous materials were sparse aggregates of particles having an aspect ratio of 3 or less with meso-pores among the particles.

In Example 2-10, modification to the α-phase is further retarded when compared with Example 2-8, which indicates improved heat resistance of intermediate alumina. However, a lanthanum aluminate phase emerges, and the product has a reduced specific surface area. Therefore, where a high specific surface area is needed, the amount of the second component, lanthanum, is preferably 0.05 mol or less per mole of alumina.

TABLE 3

| | Preparation Conditions | | | | | Physical Properties of Porous Material | | | |
|---|---|---|---|---|---|---|---|---|---|
| Example No. | Starting Aqueous Solution | Precipitation | Aging | Washing | Calcining Temp. (° C. × 5 hrs) | Crystal Phase (Secondary Phase) | Mean Pore Diameter (nm) | ±5 nm[*1] (%) | ±3 nm[*2] (%) |
| 2-6 | aluminum sulfate: 0.2 mol; lanthanum nitrate: 0.01 mol | 25% ammonia solution: 83.6 g; pH: 8.8 | 30° C. (1 atm.) × 24 hrs | done | 800 | γ-phase | 7.8 | 89 | 79 |
| | | | | | 1050 | γ,()-phase (α-phase, lanthanum aluminate) | 12.6 | 86 | 78 |
| 2-7 | do. | do. | 80° C. (1 atm.) × 2 hrs | done | 800 | γ-phase | 8.0 | 90 | 85 |
| | | | | | 1050 | γ,()-phase (α-phase, lanthanum aluminate) | 14.2 | 95 | 88 |
| 2-8 | do. | do. | 120° C. (2 atm.) × 2 hrs | done | 200 | boehmite[*3] | — | — | — |
| | | | | | 600 | γ-phase | 4.3 | 95 | 92 |
| | | | | | 800 | γ-phase | 7.5 | 94 | 91 |
| | | | | | 900 | γ-phase | 12.2 | 90 | 82 |
| | | | | | 1000 | γ-phase | 15.1 | 92 | 86 |
| | | | | | 1050 | γ-phase | 18.0 | 92 | 85 |
| | | | | | 1100 | γ-phase (()-phase) | 21.5 | 90 | 83 |
| | | | | | 1200 | ()-phase (α-phase) | 26.0 | 88 | 81 |
| 2-9 | aluminum sulfate: 0.2 mol; lanthanum nitrate: 0.006 mol | 25% ammonia solution: 82.8 g; pH: 8.8 | do. | done | 800 | γ-phase | 8.4 | 95 | 91 |
| | | | | | 1000 | γ-phase | 15.6 | 93 | 86 |
| | | | | | 1200 | α,()-phase | 27.2 | 82 | 76 |
| 2-10 | aluminum sulfate: 0.2 mol; lanthanum nitrate: 0.02 mol | 25% ammonia solution: 85.7 g; pH: 8.8 | do. | done | 800 | γ-phase | 8.8 | 96 | 90 |
| | | | | | 1000 | γ-phase | 15.9 | 92 | 85 |
| | | | | | 1200 | ()-phase (lanthanum aluminate) | 26.1 | 86 | 78 |

Note: [*1]The volume of the pores within ±5 nm at the mean pore diameter of the total meso-pore volume (%).
[*2]The volume of the pores within ±3 nm at the mean pore diameter of the total meso-pore volume (%).
[*3]Boehmite is not porous material, but precursor.

Accordingly, it is desirable that the amount of lanthanum added as a second component be 0.015 mol or more per mole of alumina from the standpoint of heat resistance of intermediate alumina.

EXAMPLE 2-10

Alumina porous materials were prepared in the same manner as in Example 2-8, except for changing the amounts of lanthanum nitrate and 25% ammonia solution to 0.02 mol and 85.7 g, respectively (pH adjusted to 8.8). The calcining

EXAMPLE 2-11

In 1 liter of water were dissolved 0.4 mol of aluminum nitrate and 0.01 mol of lanthanum nitrate to prepare a starting aqueous solution. The aqueous solution was adjusted to pH 8.5 by addition of 83.6 g of 25% ammonia solution to obtain a precipitate. The aqueous solution containing a precipitate was aged at 120° C. (2 atm.) for 2 hours, washed, dried, and calcined in the atmosphere at 600° C., 800° C., 1050° C. or 1200° C. for 5 hours to obtain alumina porous materials. The 600° to 1050° C. calcined products were γ-alumina, and the 1200° C. calcined product was θ-alumina. The alumina did not undergo modification to an α-phase even when calcined at 1200° C., proving highly heat resistant.

The mean pore diameter and the volume of the pores within ±5 nm or ±3 nm at the mean pore diameter of the total meso-pore is volume were obtained in the same manner as in Example 1. The results obtained are shown in Table 4. Further, the TEM image observation ascertained that the porous materials were sparse aggregates of particles having an aspect ratio of 3 or less with meso-pores among the particles.

EXAMPLE 2-12

Alumina porous materials were prepared in the same manner as in Example 2-11, except for changing the amounts of lanthanum nitrate and 25% ammonia solution to 0.02 mol and 85.7 g, respectively. The calcining temperature was 600° C., 800° C., 1000° C. or 1200° C. The resulting 600° to 1000° C. calcined products were γ-alumina, and the 1200° C. calcined product was θ-alumina containing lanthanum aluminate as a secondary phase.

The mean pore diameter and the volume of the pores within ±5 nm or ±3 nm at the mean pore diameter of the total meso-pore volume were obtained in the same manner as in Example 1. The results obtained are shown in Table 4. Further, TEM images revealed that the porous materials were sparse aggregates of particles having an aspect ratio of 3 or less with meso-pores among the particles.

EXAMPLE 2-13

An alumina porous material was prepared in the same manner as in Example 2-11, except that the lanthanum nitrate was replaced with 0.005 mol of titanium tetrachloride, 83 g of 25% ammonia solution was used to adjust the aqueous solution to pH 8.4, and without washing after the aging (calcining temperature: 800° C.). The resulting alumina porous material was γ-alumina.

The mean pore diameter and the volume of the pores within ±5 nm or ±3 nm at the mean pore diameter of the total meso-pore volume were obtained in the same manner as in Example 1. The results obtained are shown in Table 4. Further, the TEM image observation proved that the porous material was a sparse aggregate of particles having an aspect ratio of 3 or less with meso-pores among the particles.

As shown in Table 4, in Example 2-12 modification into an α-phase was suppressed because of the improved heat resistance, but lanthanum aluminate generated as was observed in Example 2-11. As a result, the specific surface area of the porous material was reduced. Where a high specific surface area is required, the amount of the second component, lanthanum, is preferably 0.05 mol or less per mole of alumina.

Example 2-13 demonstrates that the second porous material of the invention can be obtained as well when titanium is added as a second component.

TABLE 4

| Example No. | Preparation Conditions | | | | Physical Properties of Porous Material | | | | |
|---|---|---|---|---|---|---|---|---|---|
| | Starting Aqueous Solution | Precipitation | Aging | Washing | Calcining Temp. (° C. × 5 hrs) | Crystal Phase (Secondary Phase) | Mean Pore Diameter (nm) | ±5 nm[*1] (%) | ±3 nm[*2] (%) |
| 2-11 | aluminum nitrate: 0.4 mol; lanthanum nitrate: 0.01 mol | 25% ammonia solution: 83.6 g; pH: 8.5 | 120° C. (2 atm.) × 2 hrs | done | 600 | γ-phase | 6.5 | 98 | 95 |
| | | | | | 800 | γ-phase | 8.0 | 96 | 94 |
| | | | | | 1050 | γ-phase | 12.8 | 98 | 94 |
| | | | | | 1200 | ()-phase | 16.7 | 97 | 84 |
| 2-12 | aluminum nitrate: 0.4 mol; lanthanum nitrate: 0.02 mol | 25% ammonia solution: 85.7 g; pH: 8.5 | do. | done | 600 | γ-phase | 6.9 | 96 | 96 |
| | | | | | 800 | γ-phase | 8.4 | 98 | 97 |
| | | | | | 1000 | γ-phase | 11.0 | 83 | 69 |
| | | | | | 1200 | (lanthanum aluminate) | 23.4 | 70 | 51 |
| 2-13 | aluminum nitrate: 0.4 mol; titanium tetrachloride: 0.005 mol | 25% ammonia solution: 83 g; pH: 8.4 | do. | undone | 800 | γ-phase | 10.4 | 93 | 86 |

Note: [*1]The volume of the pores within ±5 nm at the mean pore diameter of the total meso-pore volume (%).
[*2]The volume of the pores within ±3 nm at the mean pore diameter of the total meso-pore volume (%).

COMPARATIVE EXAMPLE 2-1

Alumina porous materials were prepared in the same manner as in Example 2-6, except that aging was not conducted (calcining temperature: 800° C., 1000° C., 1050° C., 1100° C., and 1200° C.). The resulting 800° C. calcined product was γ-alumina, 1000° C. calcined product was γ,θ-mixed alumina, the 1050° C. calcined product was θ-alumina, the 1100° C. calcined product was θ-alumina with lanthanum aluminate as a secondary phase, and the 1200° C. calcined product was α,θ-mixed alumina with lanthanum aluminate as a secondary phase.

The mean pore diameter and the volume of the pores within ±5 nm or ±3 nm at the mean pore diameter of the total meso-pore volume were obtained in the same manner as in Example 1. The results obtained are shown in Table 5.

COMPARATIVE EXAMPLE 2—2

Here is presented an example of alumina by the conventional alumina pH swing method. When this method is followed, it is impossible to incorporate lanthanum, which is desired for increasing the heat resistance of alumina, at the time of alumina synthesis. Therefore, lanthanum was added by impregnation after alumina synthesis.

Aluminum sulfate was dissolved in 1 liter of ion exchange water, and the solution was heated to 90° C. A 0.6 liter of the aluminum sulfate aqueous solution was added to 1 liter of ion exchange water in a separate container heated to 95° C. To the resulting solution was added 246 ml of 25% aqueous ammonia while stirring to make the pH 9. Fifteen minutes later, a 0.1 liter portion of the aluminum sulfate aqueous solution was added to the reaction system to make the pH 4. Two minutes later, 45 ml of 25% aqueous ammonia was added thereto to make the pH 9 (first operation).

The reaction system was kept at 85 to 95° C. and, after 3 minutes, the above operation was repeated (second operation). The slurry obtained after the tenth operation was filtered. The solid was washed to remove the trace of sulfuric acid and calcined at 500° C. for 3 hours to obtain alumina. The resulting alumina porous material was found made up of fibrous particles with an aspect ratio of 5 or more.

The resulting alumina (0.2 mol) was immersed in 300 ml of ion exchange water having dissolved therein 0.01 mol of lanthanum nitrate. The impregnated alumina was dried, heat treated at 500° C. for 2 hours, and then calcined at 800° C., 900° C., 1000° C., 1050° C., 1100° C. or 1200° C. in the atmosphere for 5 hours.

The resulting 800° C. calcined product and 900° C. calcined product were γ-alumina, the 1000° C. and 1050° C. calcined products were γ-alumina with θ-alumina as a secondary phase, the 1100° C. calcined product was θ-alumina with an α-alumina as a secondary phase, and the 1200° C. calcined product was α,θ-mixed alumina with lanthanum aluminate as a secondary phase. The mean pore diameter and the volume of the pores within ±5 nm or ±3 nm at the mean pore diameter of the total meso-pore volume were obtained in the same manner as in Example 1. The results obtained are shown in Table 5. In the same manner as in Example 2—2, a TEM image was taken of the resulting alumina porous materials, and the aspect ratio of arbitrarily selected 50 particles per sample was measured. Twenty-five particles out of fifty (50%) had an aspect ratio of 3.54 (=5/√2) or more in every sample. It can be said from these results that the porous materials obtained in Comparative Example 2—2 were composed of particles having an aspect ratio of 5 or more.

It is apparent from Table 5 that the alumina porous materials of Comparative Example 2-1 wherein aging was not performed do not have a sharp pore size distribution. From the viewpoint of crystal phase stability, the alumina of Comparative Example 2-1 undergoes modification to θ- and then to α-phases at reduced temperatures, and lanthanum aluminate, which is a reaction product of lanthanum added as a second component, is detected from the 1100° C. and 1200° C. calcined products.

In Examples 2-6, 2-7, and 2-8 (corresponding to Comparative Example 2-1) wherein aging was carried out, it is recognized that the aging is effective in producing porous materials made up of particles having an aspect ratio of 3 or less with pores among the particles are connected three-dimensionally and having a mean pore diameter in a meso-pore region and a sharp pore size distribution. It is also seen that the aging is contributory to heat resistance of alumina. From the view of thermal stability of alumina crystal phases, alumina which can retain a γ-phase up to a high temperature, hardly producing an α-phase, can be said to be heat-resistant. From this point of view, it is understood that sufficient aging as in Example 2-8 not only brings about an improvement on the sharpness of pore size distribution, which owes to the uniform grain arrangement of the precursor, but achieves uniform dispersion of an additive component (e.g., lanthanum) leading to improved heat resistance of alumina.

On the other hand, Table 5 shows that the porous materials of Comparative Example 2—2 based on the conventional pH swing method fail to have a sharp pore size distribution similarly to Comparative Example 2-1. In addition, the pore size distribution curves of these comparative porous materials are trailing in the side greater than the mean pore diameter. As a result, they have a low volume of the pores within ±5 nm or ±3 nm at a mean pore diameter of the total meso-pore volume. It is easily appreciated that the pore size distribution of these porous materials is clearly different from that of the porous materials of Examples 1 and 2 (2-1 to 2-13).

Unlike the porous materials of Examples 2-1 to 2-13, the alumina porous materials of Comparative Example 2—2 comprise fibrous particles having an aspect ratio of 5 or greater as analyzed under TEM.

TABLE 5

| | Preparation Conditions | | | Physical Properties of Porous Material | | | |
|---|---|---|---|---|---|---|---|
| Compara. Example No. | Starting Aqueous Solution | Precipitation | Aging | Calcining Temp. (° C. × 5 hrs) | Crystal Phase (Secondary Phase) | Mean Pore Diameter (nm) | ±5 nm[*1] (%) | ±3 nm[*2] (%) |
| 2-1 | aluminum sulfate: 0.2 mol; lanthanum nitrate: 0.01 mol | 25% ammonia solution: 56.4 g; pH: 8.8 | undone | 800 | γ-phase | 9.0 | 65 | 52 |
| | | | | 1000 | γ,()-phase | 14.8 | 63 | 50 |
| | | | | 1050 | ()-phase | 21.3 | 60 | 50 |
| | | | | 1100 | ()-phase (lanthanum aluminate) | 23.1 | 55 | 51 |
| | | | | 1200 | α-()-phase (lanthanum aluminate) | 29.5 | 46 | 40 |
| 2-2 | | pH swing method | | 800 | γ-phase | 12.8 | 56 | 37 |
| | | | | 900 | γ-phase | 13.3 | 55 | 42 |
| | | | | 1000 | γ-phase (()-phase) | 14.4 | 50 | 32 |
| | | | | 1050 | γ-phase (()-phase) | 18.5 | 48 | 25 |
| | | | | 1100 | ()-phase (α-phase) | 21.4 | 36 | 22 |
| | | | | 1200 | α,()-phase (lanthanum aluminate) | 40.0 | 20 | 10 |

Note: [*1]The volume of the pores within ±5 nm at the mean pore diameter of the total meso-pore volume (%).
[*2]The volume of the pores within ±3 nm at the mean pore diameter of the total meso-pore volume (%).

When compared with the 1200° C. calcined product of Example 2-8 from the aspect of alumina heat resistance, the alumina of Comparative Example 2—2 underwent transformation to the α-phase and was detected containing lanthanum aluminate, the reaction product with lanthanum, proving inferior in heat resistance.

EXAMPLE 2-14

In 1 liter of water were dissolved 0.4 mol of aluminum nitrate and 0.01 mol of lanthanum nitrate to prepare a starting aqueous solution. The aqueous solution was adjusted to pH 8.5 by addition of 83.6 g of 25% ammonia solution to form a precipitate. The aqueous solution containing a precipitate was aged at 120° C. (2 atm.) for 2 hours to obtain an aqueous solution containing a precursor. The precursor was washed to remove as much by-produced salt as possible and calcined in the atmosphere at 400° C., 800° C. or 1000° C. for 5 hours to obtain alumina porous materials. The 400° C. calcined product was γ-alumina with residual boehmite, and the 800° and 1000° C. calcined products were γ-alumina.

The pore size distribution of the resulting alumina porous materials was measured with Poremaster PM-60 provided by Quantachrome Corporation. From the prepared distribution curve were obtained the mean pore diameter, the total meso-pore volume, the volume of the pores within ±5 nm at the mean pore diameter of the total meso-pore volume, and the volume of the pores within ±3 nm at the mean pore diameter of the total meso-pore volume. The specific surface area of the resulting alumina porous materials was also measured. The results obtained are shown in Table 6.

EXAMPLE 2-15

Alumina porous materials were obtained in the same manner as in Example 2-14, except that the precursor was not washed to remove the by-produced salt. That is, after the aging the aqueous solution containing a precursor was centrifuged to separate the supernatant liquid, and the residual solid was calcined at 400° C., 600° C., 800° C., 1000° C. or 1200° C. The resulting 400° C. calcined product was γ-alumina containing residual boehmite, the 600° to 1000° C. calcined products were γ-alumina, and the 1200° C. calcined product was θ-alumina.

The mean pore diameter, the meso-pore volume, the volume. of the pores within ±5 nm or ±3 nm at the mean pore diameter of the meso-pore volume, and the specific surface area were obtained in the same manner as in Example 2-14. The results obtained are shown in Table 6.

EXAMPLE 2-16

Alumina porous materials were obtained in the same manner as in Example 2-14, except that the by-produced salt was not removed by washing, and the aqueous solution containing the precursor was calcined as such at 400° C., 600° C., 800° C., 1000° C. or 1200° C. The resulting 400° C. calcined product was γ-alumina containing residual boehmite, the 600° to 1000° C. calcined products were γ-alumina, and the 1200° C. calcined product comprised θ-alumina and lanthanum aluminate.

The mean pore diameter, the meso-pore volume, the volume of the pores within ±5 nm or ±3 nm at the mean pore diameter of the meso-pore volume, and the specific surface area were obtained in the same manner as in Example 2-14. The results obtained are shown in Table 6.

EXAMPLE 2-17

Alumina porous materials were obtained in the same manner as in Example 2-14, except that additional 1.23 mol of ammonium nitrate was added to the starting aqueous solution containing 0.4 mol of aluminum nitrate and 0.01 mol of lanthanum nitrate and that washing was not conducted after aging. This is an example in which aging and calcination (at 800° C. or 1000°) are carried out in the presence of a positively added by-produced salt. The resulting 800° C. and 1000° C. calcined products were both γ-alumina.

The mean pore diameter, the meso-pore volume, the volume of the pores within ±5 nm or ±3 nm at the mean pore diameter of the meso-pore volume, and the specific surface area were obtained in the same manner as in Example 2-14. The results obtained are shown in Table 6.

EXAMPLE 2-18

Alumina porous materials were obtained in the same manner as in Example 2-14, except for replacing 1.23 mol of ammonium nitrate with 30 wt %, based on alumina, of a surface active agent (Reokon 1020H, a trade name of Lion Corp.). The calcining temperature was 800° C. or 1000°. Example 2-18 is to provide an example in which aging and calcination are carried out in the presence of not only the by-produced salt but the surface active agent. The resulting 800° C. and 1000° C. calcined products were both γ-alumina.

The mean pore diameter, the meso-pore volume, the volume of the pores within ±5 nm or ±3 nm at the mean pore diameter of the meso-pore volume, and the specific surface area were obtained in the same manner as in Example 2-14. The results obtained are shown in Table 6.

COMPARATIVE EXAMPLE 2-3

Here is displayed an example in which the grain arrangement of the precursor once having acquired uniformity is mechanically destroyed. To an alumina precursor synthesized in the same manner as in Example 2-14 was added a surface active agent Reokon in an amount of 30 wt % based on alumina, and the mixture was vigorously stirred in a homogenizer and calcined at 800° C. or 1000° C. The resulting calcined products were both γ-alumina. The mean pore diameter, the meso-pore volume, the volume of the pores within ±5 nm or ±3 nm at the mean pore diameter of the meso-pore volume, and the specific surface area were obtained in the same manner as in Example 2-14. The results obtained are shown in Table 6.

COMPARATIVE EXAMPLE 2-4

An example is afforded here, in which the grain arrangement of a precursor once having acquired uniformity is mechanically destroyed, and calcination is performed under such conditions that would not allow particles to aggregate.

An alumina precursor synthesized in the same manner as in Example 2-14 was mixed with 30 wt %, based on alumina, of kerosine, and the mixture was vigorously stirred in a homogenizer and spray pyrolyzed at 830° C. to convert the precursor into alumina. Spray pyrolysis involves rapid heating so that the sprayed particles may not aggregate while the solvent evaporates and the precursor decomposes.

The resulting 830° C. calcined product was γ-alumina. The mean pore diameter, the meso-pore volume, the volume of the pores within ±5 nm or ±3 nm at the mean porn diameter of the meso-pore volume, and the specific surface area were obtained in the same manner as in Example 2-14. The results obtained are shown in Table 6.

TABLE 6

| | | | | Physical Properties of Porous Material | | | | | |
|---|---|---|---|---|---|---|---|---|---|
| | Preparation Conditions[*1] | | | | | | | Meso-pore | Specific |
| | Wash-ing | Conditions for Aging and Calcining | Calcining Temp. (° C. × 5 hrs) | Crystal Phase (Secondary Phase) | Mean Pore Diameter (nm) | ±5 nm[*2] (%) | ±3 nm[*3] (%) | Volume (cc/g) | Surface Area (m$^2$/g) |
| Example 2-14 | done | by-produced salt was removed from the precursor-containing aqueous solution as much as possible after aging | 400 800 1000 | γ-phase (boehmite) γ-phase γ-phase | 5.4 9.6 12.2 | 99 99 99 | 99 97 94 | 0.286 0.367 0.338 | 218 147 99 |
| Example 2-15 | undone | the precursor-containing aqueous solution was centrifuged to separate the supernatant liquid and the residual solid was calcined | 400 600 800 1000 1200 | γ-phase (boehmite) γ-phase γ-phase γ-phase θ-phase | 5.7 7.6 9.2 13.3 17.8 | 99 99 98 95 70 | 99 96 94 87 51 | 0.229 0.283 0.274 0.277 0.182 | 292 172 157 93 34 |
| Example 2-16 | undone | the precursor-containing aqueous solution was calcined as it was | 400 600 800 1000 1200 | γ-phase (boehmite) γ-phase γ-phase γ-phase θ-phase lanthanum aluminate | 6.1 7.5 9.8 13.5 20.1 | 93 95 95 91 70 | 93 92 89 83 51 | 0.262 0.327 0.332 0.332 0.201 | 264 199 159 107 32 |
| Example 2-17 | undone | aging was conducted in the presence of (positively added) by-produced salt and calcination was then conducted in the same manner as in Example 2-16 | 800 1000 | γ-phase γ-phase | 10.1 15.3 | 83 91 | 72 81 | 0.372 0.340 | 158 90 |
| Example 2-18 | undone | aging was conducted in the co-presence of (positively added) a surface active agent and calcination was then conducted in the same manner as in Example 2-16 | 800 1000 | γ-phase γ-phase | 11.2 13.8 | 94 80 | 86 71 | 0.381 0.360 | 150 88 |
| Compara. Example 2-3 | undone | uniform grain arrangement of precursor was destroyed and then calcined | 800 1000 | γ-phase γ-phase | 10.2 15.7 | 70 65 | 54 46 | 0.441 0.456 | 164 65 |
| Compara. Example 2-4 | undone | uniform grain arrangement of precursor was destroyed and then calcined without aggregation of particles | 830 | γ-phase | 5.3 8.9 23.8 | 40 44 17 | 30 23 14 | 0.305 | — |

Note: [*1]A precipitate was formed by adjustment to pH 8.8 with 25% ammonia solution (83.6 g), and aging was 120° C. (2 atm.) × 2 hours.
[*2]The volume of the pores within ±5 nm at the mean pore diameter of the total meso-pore volume (%).
[*3]The volume of the pores within ±3 nm at the mean pore diameter of the total meso-pore volume (%).

The following observations can be drawn from Table 6.
(1) When the grain arrangement of a precursor is destroyed by vigorous stirring, and the system is calcined in the same manner as in Example 2-16 while maintaining the destroyed state in the presence of a surface active agent, the resulting porous material has a broad pore size distribution (Comparative Example 2-3). As is clearly seen, in order to obtain the porous material of the invention which has a sharp pore size distribution, it is necessary for the precursor to be calcined while retaining its grain arrangement.
(2) When a precursor is vigorously stirred to have its grain arrangement completely destroyed and spray pyrolyzed so that the particles may not agglomerate, the resulting porous material shows a broad pore size distribution with more than one peak in a meso-pore region. In fact, the pore size distribution curve of Comparative Example 2-4 had broad peaks (mean pore diameter) at 5.3 nm, 8.9 nm, and 23.8 nm. It is easily recognized to be indispensable for obtaining the porous material of the invention having a sharp pore size distribution to aggregate the particles through water removal by calcining while retaining the grain arrangement of the precursor.
(3) As can be seen from the facts (1) and (2) observed in Comparative Examples 2-3 and 2-4, a desired porous material as aimed at in the invention can be obtained in any of the following embodiments (a) to (d) as long as the process of production satisfies the indispensable conditions for achieving "maintenance of the grain arrangement of a precursor" and "aggregation of particles by calcining to remove water while maintaining the grain arrangement":

(a) By-produced salt is removed from an aqueous solution containing a precursor by washing to the highest possible degree as in Example 2-14.

(b) Excess water is removed from an aqueous solution containing a precursor by centrifugation as in Example 2-15.

(c) Excess water and by-produced salt are not removed as in Example 2-16.

(d) A system is aged and calcined in the presence of substances other than an additive element, such as a decomposable salt (e.g., ammonium nitrate) or a surface active agent, as in Examples 2-17 and 2-18.

Accordingly, all these embodiments fall within the scope of the present invention.

EXAMPLE 3

Preparation of Zirconia Porous Material (Second Porous Material)

To 600 ml of ion exchange water was added 273.2 g of a zirconium oxynitrate solution ($ZrO_2$: 18 wt %) to prepare a starting aqueous solution. To the solution was added 55 g of 25% aqueous ammonia, and the aqueous solution containing a resultant precipitate was aged at 120° C. (2 atm.) or 113°

C. (1.6 atm.) for 2 hours, washed with water, dried, and calcined in the atmosphere at 400° C. or 600° C. for 5 hours to obtain zirconia porous materials.

The mean pore diameter and the volume of the pores within ±5 nm or ±3 nm at the mean pore diameter of the meso-pore volume were obtained in the same manner as in Example 1. The results obtained are shown in Table 7. The TEM image observation revealed that the porous materials were sparse aggregates of particles having an aspect ratio of 3 or less with meso-pores among the particles.

EXAMPLE 4
Preparation of Titania Porous Material (Second Porous Material):

In 1000 ml of ion exchange water was dissolved 0.3 mol of titanium tetrachloride to prepare a starting aqueous solution. To the solution was added 81.6 g of 25% ammonia solution to form a precipitate. The aqueous solution containing a precipitate was aged at 120° C. (2 atm.) or 113° C. (1.6 atm.) for 2 hours, washed with water, dried, and calcined in the atmosphere at 400° C., 600° C. or 800° C. for 5 hours to obtain titania porous materials.

The mean pore diameter and the volume of the pores within ±5 nm or ±3 nm at the mean pore diameter of the meso-pore volume were obtained in the same manner as in Example 1. The results obtained are shown in Table 7. Further, the TEM image observation proved that the titania porous materials were sparse aggregates of particles having an aspect ratio of 3 or less with meso-pores among the particles.

EXAMPLE 5
Preparation of Spinel Porous Material (Second Porous Material):

In 1800 ml of ion exchange water were dissolved 107 g of magnesium acetate and 379 g of aluminum nitrate to prepare a starting aqueous solution. To the solution was added 650 g of 25% ammonia solution to form a precipitate. The aqueous solution containing a precipitate was aged at 120° C. (2 atm.) for 2 hours, washed with water, dried, and calcined in the atmosphere at 850° C. for 5 hours to obtain a spinel (magnesium-aluminum complex oxide) porous material.

The mean pore diameter and the volume of the pores within ±5 nm or ±3 nm at the mean pore diameter of the meso-pore volume were obtained in the same manner as in Example 1. The results obtained are shown in Table 7. The TEM image observation proved that the magnesia porous material was a sparse aggregate of particles having an aspect ratio of 3 or less with meso-pores among the particles.

EXAMPLE 6
Preparation of Iron Oxide Porous Material (Second Porous Material):

In 1000 ml of ion exchange water was dissolved 0.4 mol of iron nitrate to prepare a starting aqueous solution. To the solution was added 81.6 g of 25% ammonia solution to form a precipitate. The aqueous solution containing a precipitate was aged at 120° C. (2 atm.) for 2 hours, washed with water, dried, and calcined in the atmosphere at 400° C. or 600° C. for 5 hours to obtain iron oxide porous materials.

The mean pore diameter and the volume of the pores within ±5 nm or ±3 nm at the mean pore diameter of the meso-pore volume were obtained in the same manner as in Example 1. The results obtained are shown in Table 7. Further, the TEM image observation proved that the iron oxide porous materials were sparse aggregates of particles having an aspect ratio of 3 or less with meso-pores among the particles.

EXAMPLE 7
Preparation of Ceria Porous Material (Second Porous Material):

In 1000 ml of ion exchange water was dissolved 0.3 mol (in terms of $CeO_2$) of cerium nitrate solution ($CeO_2$: 28.3 wt %) to prepare a starting aqueous solution. To the solution was added 81.6 g of 25% ammonia solution to form a precipitate. The aqueous solution containing a precipitate was aged at 120° C. (2 atm.), 113° C. (1.6 atm.) or 80° C. (1 atm.) for 2 hours, washed with water, dried, and calcined in the atmosphere at 400° C., 600° C. or 800° C. for 5 hours to obtain ceria porous materials.

The mean pore diameter and the volume of the pores within ±5 nm or ±3 nm at the mean pore diameter of the meso-pore volume were obtained in the same manner as in Example 1. The results obtained are shown in Table 7. Further, the TEM image observation proved that the ceria porous materials were sparse aggregates of particles having an aspect ratio of 3 or less with meso-pores among the particles.

TABLE 7

| | Composition of Porous Material | Preparation Conditions | | | | Physical Properties of Porous Material | | |
|---|---|---|---|---|---|---|---|---|
| | | Starting Aqueous Solution | Precipitation | Aging (× 2 hrs) | Calcination (° C. × 5 hrs) | Mean Pore Diameter (nm) | ±5 nm[*1] | ±3 nm[*2] |
| Example 3 | $ZrO_2$ | zirconium oxynitrate (18 wt % $ZrO_2$): 273.2 g | 25% ammonia solution: 55 g | 120° C. (2 atm) | 400 | 10.2 | 66.1 | 49.6 |
| | | | | | 600 | 19.3 | 44.5 | 33.1 |
| | | | | 113° C. (1.6 atm) | 400 | 9.5 | 73.6 | 60.2 |
| | | | | | 600 | 20.5 | 68.4 | 52.1 |
| Example 4 | $TiO_2$ | titanium tetrachloride: 0.3 mol | 25% ammonia solution: 81.6 g | 120° C. (2 atm) | 400 | 14.3 | 77.1 | 59.4 |
| | | | | | 600 | 17.9 | 61.8 | 48.5 |
| | | | | | 800 | 23.9 | 55.9 | 42.5 |
| | | | | 113° C. (1.6 atm) | 400 | 19.3 | 84.6 | 62.3 |
| | | | | | 600 | 21.8 | 95.0 | 77.0 |
| Example 5 | $MgAl_2O_4$ | magnesium acetate: 107 g, aluminum nitrate: 379 g | 25% ammonia solution: 650 g | 120° C. (2 atm) | 850 | 20.0 | 83.2 | 70.1 |

TABLE 7-continued

| | Composition of Porous Material | Preparation Conditions | | | Calcination (° C. × 5 hrs) | Physical Properties | | |
| --- | --- | --- | --- | --- | --- | --- | --- | --- |
| | | Starting Aqueous Solution | Precipitation | Aging (× 2 hrs) | | of Porous Material | | |
| | | | | | | Mean Pore Diameter (nm) | ±5 nm*1 | ±3 nm*2 |
| Example 6 | $Fe_2O_3$ | iron nitrate: 0.4 mol | 25% ammonia solution: 81.6 g | 120° C. (2 atm) | 400 | 39.5 | 43.0 | 26.5 |
| | | | | | 600 | 64.3 | 40.0 | — |
| Example 7 | $CeO_2$ | cerium nitrate: 0.3 mol | 25% ammonia solution: 81.6 g | 120° C. (2 atm) | 400 | 14.5 | 91.7 | 78.1 |
| | | | | | 600 | 14.7 | 72.9 | 59.2 |
| | | | | | 800 | 14.8 | 96.1 | 81.3 |
| | | | | 113° C. (1.6 atm) | 400 | 23.2 | 79.1 | 56.9 |
| | | | | | 600 | 23.9 | 80.8 | 58.3 |
| | | | | 80° C. (1 atm) | 400 | 16.7 | 85.4 | 65.7 |

Note: *1 The volume of the pores within ±5 nm at the mean pore diameter of the total meso-pore volume (%).
*2 The volume of the pores within ±3 nm at the mean pore diameter of the total meso-pore volume (%).

As stated respectively, all the oxide porous materials obtained in Examples 3 to 7 are sparse aggregates of particles having an aspect ratio of 3 or less with meso-pores among the particles. As is apparent from Table 7, these porous materials have pores whose mean pore diameter is in a meso-pore region with a sharp distribution, at least a part of the pores are connected three-dimensionally to form random passages, the passages forming a three-dimensional network structure. Further, they have substantially no fibrous structure.

EXAMPLE 8

Examples 8-1 to 8-4 demonstrate catalysts for purifying exhaust gases comprising the alumina porous material of the invention as a carrier. For comparison, Comparative Examples 3-1 to 3-4, which correspond to Examples 8-1 to 8-4, respectively, are given next to the corresponding Examples.

EXAMPLE 8-1

Preparation of Catalyst $A_1$:

Twenty grams of the 800° C. calcined product powder prepared in Example 2-8 was impregnated with a dinitrodiammineplatinum nitrate solution to deposit 1 g of platinum per 120 g-carrier. After drying, the impregnated powder was calcined in the atmosphere at 500° C. for 2 hours to obtain a catalyst. The catalyst was compressed and broken into pellets of 0.5 to 1 mm. The resulting catalyst was designated catalyst $A_1$.

Preparation of Catalyst $A_2$:

Catalyst $A_1$ was exposed to 1000° C. for 5 hours in an atmosphere alternating from a mixed gas composed of 3% oxygen, 3% water, and remainder nitrogen to a mixed gas composed of 3% water and remainder nitrogen every 5 minutes. This treatment will be referred to as a high-temperature durability test. The catalyst thus treated was designated catalyst $A_2$.

Catalytic Performances of Catalysts $A_1$ and $A_2$:

Each of catalysts $A_1$ and $A_2$ weighing 0.5 g was packed in a fixed bed catalytic reactor. A mixed gas modeling an emission from an engine operating at a stoichiometric point (with a variation of 4% at 2-second intervals) was made to flow through the reactor at a rising temperature to obtain the temperature at which each of hydrocarbons (HC), nitrogen oxides ($NO_x$) and carbon monoxide (CO) of the mixed gas was reduced by 50% (hereinafter referred to as $HC_{50}$, $NO_{50}$, and $CO_{50}$, respectively) at a space velocity (S.V.) of 250,000 $hr^{-1}$.

As a result, $HC_{50}$, $NO_{50}$, and $CO_{50}$ of catalyst $A_1$ were found to be 249° C., 239° C., and 239° C., respectively; and those of catalyst $A_2$ were 436° C., 436° C., and 430° C., respectively. These results are shown in Table 8 below.

COMPARATIVE EXAMPLE 3-1

Preparation of Catalyst $a_1$:

A platinum-on-carrier catalyst of pellet form was prepared in the same manner as in Example 8-1, except for using the 800° C. calcined product powder prepared in Comparative Example 2—2 (an alumina porous material by the conventional pH swing method) as a carrier. The resulting catalyst was designated catalyst $a_1$.

Preparation of Catalyst $a_2$:

Catalyst $a_1$ was subjected to a high-temperature durability test in the same manner as in Example 8-1. The catalyst thus treated was designated catalyst $a_2$.

Catalytic Performances of Catalysts $a_1$ and $a_2$:

Catalysts $a_1$ and $a_2$ (0.5 g) were evaluated in the same manner as in Example 8-1. As a result, $HC_{50}$, $NO_{50}$, and $CO_{50}$ of catalyst $a_1$ at an S.V. of 140,000 $hr^{-1}$ were found to be 273° C., 252° C., and 251° C., respectively; and those of catalyst $a_2$ at an S.V. of 160,000 $hr^{-1}$ were 470° C., 467° C., and 455° C., respectively. These results are shown in Table 8.

The initial catalytic performance of the catalyst of the invention can be appreciated by comparing catalyst $A_1$ of Example 8-1 with catalyst $a_1$ of Comparative Example 3-1. Although catalyst $A_1$ is under a severe S.V. condition about 1.8 times that for catalyst $a_1$, it is seen that the former is more active than the latter by 24° C. in terms of $HC_{50}$, the temperature at which HC of the mixed gas was reduced by 50%. Electron probe micro analysis (EPMA) and secondary ion mass spectroscopy (SIMS) on catalysts $A_1$ and $a_1$ revealed that the concentration of Pt in the vicinities of the surface of the secondary particles of the carrier in catalyst $A_1$ was about 20% higher than that in catalyst $a_1$. That is, platinum can be supported on the surface of the carrier of Example 2-8 in a high concentration by a commonly employed impregnation technique so that the resulting catalyst $A_1$ exhibits high initial catalytic activity than catalyst $a_1$ even under a severe S.V. condition. Further, since catalyst $A_1$ has the noble metal in an increased concentration, there is no need to increase the amount of the noble metal (as observed by EPMA) to increase the noble metal concentration in the vicinities of the carrier surface, which offers an economical advantage. The least increase in concentration of the noble metal on the carrier surface enough to produce an appreciable effect is 10%.

Turning now to the catalysts having been subjected to a high-temperature durability test, catalyst $A_2$ is more active than catalyst $a_2$ by 34° C. in terms of $HC_{50}$ although the former is used at an S.V. condition about 1.6 times as severe as that at which the latter is used. The higher catalytic activity of catalyst $A_2$ under the severer S.V. condition can be explained by the fact that the platinum particles on catalyst $A_2$ had a grain size of 29.5 nm measured by X-ray diffractometry whereas those on catalyst $a_2$ had grown to a grain size of 35.2 nm.

Although platinum present on the catalyst $A_1$ has an increased concentration and seems ready to grow in grains, it is suppressed from growing. This implies that a carrier whose pores have a mean pore diameter in a meso-pore region and a sharp pore size distribution is effective at suppression of platinum grain growth. All these considerations prove the alumina porous material according to the invention excellent as a carrier for platinum.

EXAMPLE 8-2

Preparation of Catalyst $B_2$:

Twenty grams of the 600° C. calcined product powder prepared in Example 2-12 was impregnated with a dinitrodiammineplatinum nitrate solution to deposit 1 g of platinum per 300 cc-carrier. After drying, the impregnated powder was fired in the atmosphere at 500° C. for 2 hours to obtain a catalyst. The catalyst powder was compressed, broken into pellets of 0.5 to 1 mm, and subjected to a high-temperature durability test, in the same manner as in Example 8-1. The catalyst thus treated was designated catalyst $B_2$.

Catalytic Performance of Catalyst $B_2$:

Catalysts $B_2$ (2 cc or 1 cc) was packed in a fixed bed catalytic reactor and tested in the same manner as in Example 8-1. As a result, $HC_{50}$, $NO_{50}$, and $CO_{50}$ at an S.V. of 100,000 $hr^{-1}$ were found to be 451° C., 442° C., and 413° C., respectively, and those at an S.V. of 200,000 $hr^{-1}$ were 466° C., 463° C., and 416° C., respectively. These results are summarized in Table 8 below.

COMPARATIVE EXAMPLE 3-2

Preparation of Catalyst $b_2$:

A platinum-on-carrier catalyst was prepared and subjected to a high-temperature durability test in the same manner as in Example 8-2, except for using the 800° C. calcined product powder prepared in Comparative Example 2—2 (an alumina porous material by the conventional pH swing method) as a carrier. The resulting catalyst was designated catalyst $b_2$.

Catalytic Performance of Catalyst $b_2$:

Catalyst $b_2$ was tested in the same manner as in Example 8-2. As a result, $HC_{50}$, $NO_{50}$, and $CO_{50}$ at an S.V. of 100,000 $hr^{-1}$ were 461° C., 459° C., and 425° C., respectively, and those at an S.V. of 200,000 $hr^{-1}$ were 509° C., 509° C., and 439° C., respectively. These results are shown in Table 8 below.

Catalyst $B_2$ is more active than catalyst $b_2$ by 10° C. in terms of $HC_{50}$ at an S.V. of 100,000 $hr^{-1}$ and by 43° C. at 200,000 $hr^{-1}$. From the fact that the platinum particles on catalyst $B_2$ had a grain size of 27.8 nm as determined by X-ray diffractometry whereas those on catalyst $b_2$ had grown to 35.2 nm, the higher catalytic activity of catalyst $B_2$ can be interpreted to mean that catalyst $B_2$ had shown greater endurance to keep its catalytic activity during the high-temperature durability test than catalyst $b_2$.

Further, it is seen that catalyst $B_2$ showed an increase or $HC_{50}$ by 15° C. on increasing the S.V. from 100,000 $hr^{-1}$ to 200,000 $hr^{-1}$, while catalyst $b_2$ underwent an increase of $HC_{50}$ by 48° C. in the same situation. These results verify that the catalyst using the alumina porous material of the invention whose mean pore diameter is in a meso-pore region with a sharp size distribution as a carrier has excellent S.V. characteristics.

EXAMPLE 8-3

Preparation of Catalyst $C_1$:

A catalyst was prepared in the same manner as in Example 8-1, except that palladium nitrate was used to deposit 2 g of palladium per 120 g-carrier. The resulting catalyst was designated catalyst $C_1$.

Preparation of Catalyst $C_2$:

Catalyst $C_1$ was subjected to a high-temperature durability test in the same manner as in Example 8-1. The catalyst after the high-temperature durability test was designated catalyst $C_2$.

Catalytic Performances of Catalysts $C_1$ and $C_2$:

Catalysts $C_1$ and $C_2$ were evaluated in the same manner as in Example 8-1. As a result, $HC_{50}$, $NO_{50}$, and $CO_{50}$ of catalyst $C_1$ at an S.V. of 250,000 $hr^{-1}$ were 193° C., 163° C., and 191° C., respectively; and those of catalyst $C_2$ at the same S.V. were 255° C., 248° C., and 252° C., respectively. These results are summarized in Table 8.

COMPARATIVE EXAMPLE 3—3

Preparation of Catalyst $c_1$:

A catalyst was prepared in the same manner as in Comparative Example 3-1, except that palladium nitrate was used to deposit 2 g of palladium per 120 g-carrier. The resulting catalyst was designated catalyst $c_1$.

Preparation of Catalyst $c_2$:

Catalyst $c_1$ was subjected to a high-temperature durability test in the same manner as in Example 8-3. The catalyst after the high-temperature durability test was designated catalyst $c_2$.

Catalytic Performances of Catalysts $c_1$ and $c_2$:

Catalysts $c_1$ and $c_2$ were evaluated in the same manner as in Example 8-1. As a result, $HC_{50}$, $NO_{50}$, and $CO_{50}$ of catalyst $c_1$ at an S.V. of 150,000 $hr^{-1}$ were 201° C., 160° C., and 198° C., respectively; and those of catalyst $c_2$ at the same S.V. were 273° C., 285° C., and 263° C., respectively. These results are shown in Table 8.

Compare the initial catalytic performance of the catalysts of Example 8-3 and Comparative Example 3—3. Although the catalyst $C_1$ is tested under a severe S.V. condition about 1.7 times as high as that used for catalyst $c_1$, the former is more active than the latter by 8° C. in terms of $HC_{50}$. Catalysts $C_1$ and $c_1$ were reduced with nitrogen gas containing 1% hydrogen at 500° C. for 2 hours to convert palladium oxide to metallic palladium and analyzed by X-Ray photoelectron spectroscopy (XPS). It was found that the concentration of Pd in the vicinities of the surface of the secondary particles of the carrier in catalyst $C_1$ was about 30% higher than that in catalyst $c_1$, which supports the higher initial performance of catalyst $C_1$ than that of catalyst $c_1$ (XPS was adopted here in place of EPMA used in Example 8-1 and Comparative Example 3-1 because the peaks of Al and Pd overlap in EPMA). As was the case for platinum, high concentration of palladium on the carrier surface can be achieved in Example 8-3, excluding the necessity to increase the amount of the noble metal to increase the noble metal concentration in the vicinities of the carrier surface, which is economically advantageous. Considering that the least increase in concentration of the noble metal on the carrier surface enough to produce an appreciable effect is 10%, catalyst $C_1$ surpasses that level considerably.

Turning to the catalytic performance after the high-temperature durability test, catalyst $C_2$ is more active than catalyst $c_2$ by 18° C. in terms of $HC_{50}$ although the former is used at an S.V. condition about 1.7 times as severe as that used for the latter. This is supported by the fact that the PdO particles and Pd particles on catalyst $C_2$ are smaller than those on catalyst $c_2$ as observed by X-ray diffractometry, which means that the noble metal particles on catalyst $C_1$ had been suppressed from sintering. Thus, catalyst $C_1$ exhibits higher catalytic performance even after exposure to high temperature than catalyst $c_1$.

Although palladium present on the catalyst $C_1$ has an increased concentration and seems ready to grow in grains, the Pd or PdO can be suppressed from growing during exposure to high temperature as is proved in catalyst $C_2$. It is thus appreciated that the alumina porous material of the invention whose pores have a mean pore diameter in a meso-pore region and a sharp pore size distribution is superior as a carrier for palladium as well as for platinum.

EXAMPLE 8-4

Preparation of Catalyst $D_1$:

A slurry was prepared from 100 g of the 800° C. calcined product powder (alumina porous material) obtained in Example 2-8, 60 g of a ceria-zirconia solid solution, 20 g of lanthanum carbonate, and an alumina-based binder and water. The slurry was dried, calcined at 600° C. and impregnated with a dinitrodiammineplatinum nitrate solution and a rhodium nitrate solution to deposit 1 g of Pt and 0.2 g of Rh per 120 g-carrier (alumina porous material). The impregnated powder was compressed and broken into 0.5 to 1 mm pellets. The resulting catalyst was designated catalyst $D_1$.

Preparation of Catalyst $D_2$:

Catalyst $D_1$ was subjected to a high-temperature durability, test, in which the catalyst was exposed to 1000° C. for 5 hours in an atmosphere alternating between a mixed gas composed of stoichiometric gas, 5% oxygen, and 3% water (1 minute) and a mixed gas composed of stoichiometric gas, 1% hydrogen, and 3% water (5 minutes). The catalyst thus treated was designated catalyst $D_2$.

Catalytic Performances of Catalysts $D_1$ and $D_2$:

The fixed bed catalytic reactor was loaded with 0.794 g each of catalysts $D_1$ and $D_2$. A mixed gas modeling an emission from an engine operating under a stoichiometric condition was made to flow through the reactor at a dropping temperature to obtain $HC_{50}$, $NO_{50}$, and $CO_{50}$ at an S.V. of 220,000 $hr^{-1}$. As a result, $HC_{50}$, $NO_{50}$, and $CO$ of catalyst $D_1$ were 215° C., 210° C., and 210° C., respectively; and those of catalyst $D_2$ were 331° C., 298° C., and 289° C., respectively. These results are shown in Table 8 below.

COMPARATIVE EXAMPLE 3-4

Preparation of Catalyst $d_1$:

A noble metal-on-carrier catalyst in pellet form was prepared in the same manner as in Example 8-4, except for using the 800° C. calcined product powder prepared in Comparative Example 2—2 (an alumina porous material by the conventional pH swing method) as a carrier. The resulting catalyst was designated catalyst $d_1$ Preparation of Catalyst $d_2$:

Catalyst $d_1$ was subjected to a high-temperature durability test in the same manner as in Example 8-4. The catalyst thus treated was designated catalyst $d_2$.

Catalytic Performances of Catalysts $d_1$ and $d_2$:

Catalysts $d_1$ and $d_2$ were evaluated in the same manner as in Example 8-4. As a result, $HC_{50}$, $NO_{50}$, and $CO_{50}$ at an S.V. of 165,000 $hr^{-1}$ of catalyst $d_1$ were 255° C., 228° C., and 229° C., respectively, while those of catalyst $d_2$ were 342° C., 299° C., and 312° C., respectively. These results are summarized in Table 8.

With respect to the initial catalytic performance, catalyst $D_1$ is more active than catalyst $d_1$ by 40° C. in terms of $HC_{50}$ although the former is under an S.V. condition about 1.3 times as high as that for the latter.

As for the catalytic performance after the high-temperature durability test, it is seen that catalyst $D_2$ is more active than catalyst $d_2$ by 11° C. in terms of $HC_{50}$ although the former is under an S.V. condition about 1.3 times as high as that for the latter. X-Ray diffractometry revealed that the particle diameter of the Pt particles on catalyst $D_2$ was 20.9 nm whereas that on catalyst $d_2$ was 26.8 nm due to grain growth, supporting the higher catalytic activity of the catalyst of the invention after the high-temperature durability test (catalyst $D_2$) than the comparative catalyst $d_2$. It has now been proved that the alumina porous material of the invention is superior as a carrier for platinum and rhodium and also in a system comprising a promotor, etc.

TABLE 8

| | Catalyst | | | | | Conversion Temp. (° C.) | | |
|---|---|---|---|---|---|---|---|---|
| | Designation | Carrier | Noble Metal | Amount of Noble Metal /Carrier | Evaluation Method | $HC_{50}$ | $NO_{50}$ | $CO_{50}$ |
| Example 8-1 | $A_1$ | 800° C. calcined product of Example 2-8 | Pt | 1 g/120 g | rising temp.; SV = 250,000 $hr^{-1}$ | 249 | 239 | 239 |
| | $A_2$ | | | | do. | 436 | 436 | 430 |
| Compara. Example 3-1 | $a_1$ | 800° C. calcined product of Compara. Example 2-2 | Pt | 1 g/120 g | rising temp.; SV = 140,000 $hr^{-1}$ | 273 | 252 | 251 |
| | $a_2$ | | | | rising temp.; SV = 160,000 $hr^{-1}$ | 470 | 467 | 455 |
| Example 8-2 | $B_2$ | 600° C. calcined product of Example 2-12 | Pt | 1 g/300 cc | rising temp.; SV = 100,000 $hr^{-1}$ | 451 | 442 | 413 |
| | | | | | rising temp.; SV = 200,000 $hr^{-1}$ | 466 | 463 | 416 |
| Compara. Example 3-2 | $b_2$ | 800° C. calcined product of Compara. Example 2-2 | Pt | 1 g/300 cc | rising temp.; SV = 100000 $hr^{-1}$ | 461 | 459 | 425 |
| | | | | | rising temp.; SV = 200,000 $hr^{-1}$ | 509 | 509 | 439 |

TABLE 8-continued

| | Catalyst | | | | | Conversion Temp. (° C.) | | |
|---|---|---|---|---|---|---|---|---|
| | Designation | Carrier | Noble Metal | Amount of Noble Metal /Carrier | Evaluation Method | $HC_{50}$ | $NO_{50}$ | $CO_{50}$ |
| Example 8-3 | $C_1$ | 800° C. calcined product of Example 2-8 | Pd | 2 g/120 g | rising temp.; SV = 250,000 $hr^{-1}$ | 193 | 163 | 191 |
| | $C_2$ | | | | do. | 255 | 248 | 252 |
| Compara. Example 3-3 | $c_1$ | 800° C. calcined product of Compara. Example 2-2 | Pd | 2 g/120 g | rising temp.; S = 150,000 $hr^{-1}$ | 201 | 160 | 198 |
| | $c_2$ | | | | do. | 273 | 285 | 263 |
| Example 8-4 | $D_1$ | 800° C. calcined product of Example 2-8 | Pt, Rh | 1 g-Pt/120 g, 0.2 g-Rh/120 g | dropping temp.; SV = 220,000 $hr^{-1}$ | 215 | 210 | 210 |
| | $D_2$ | | | | do. | 331 | 298 | 289 |
| Compara. Example 3-4 | $d_1$ | 800° C. calcined product of Compara. Example 2-2 | Pt, Rh | 1 g-Pt/120 g, 0.2 g-Rh/120 g | dropping temp.; SV = 165,000 $hr^{-1}$ | 255 | 228 | 229 |
| | $d_2$ | | | | do. | 342 | 299 | 312 |

EXAMPLE 9

Examples 9-1 through 9-5 display examples of catalysts for purifying exhaust gases which comprise the porous material of the invention as a carrier and platinum (Pt) and, as an $NO_x$ storage component, potassium (K) supported thereon.

Catalysts used in Examples 9-1 to 9-5 (carriers 1 to 4 and 6) and in Comparative Examples 4-1 and 4-2 (carriers 5 and 7) were prepared as follows.

(1) Preparation of Carriers 1 to 4:

Carriers 1 to 4 are alumina porous materials prepared in the same manner as in Example 2-15. That is, 0.4 mol of aluminum nitrate and 0.01 mol of lanthanum nitrate were dissolved in 1 liter of water to prepare a starting aqueous solution. The solution was adjusted to pH 8.8 with 83.6 g of 25% aqueous ammonia to obtain a precipitate, aged at 120° C. (2 atm.) for 2 hours, and centrifuged to separate the supernatant liquid. The residual solid was calcined at 400° C., 800° C., 1000° C. or 1200° C. for 5 hours. The resulting 400° C. calcined product, 800° C. calcined product, 1000° C. calcined product, and 1200° C. calcined product were designated carriers 1, 2, 3, and 4, respectively.

Carrier 1 was γ-alumina (with boehmite as a secondary phase) having a specific surface area of 292 $m^2/g$. Carrier 2 was γ-alumina having a specific surface area of 157 $m^2/g$. Carrier 3 was γ-alumina (with a θ-phase as a secondary phase) having a specific surface area of 93 $m^2/g$. Carrier 4 was γ-alumina (with a θ-phase as a secondary phase) having a specific surface area of 40 $m^2/g$. Carrier 5 was γ-alumina having a specific surface area of 204 $m^2/g$.

The pore size distribution curve of each carrier was measured with PMI Porometer, from which the mean pore diameter and the proportion of the volume of pores within a range of 2 to 20 nm in the total meso-pore volume in a range of 2 to 100 nm were calculated.

TEM images demonstrated each carrier to be an aggregate of particles forming pores among themselves as illustrated in FIG. 1B. Carriers 1 to 4 were found free from a fibrous structure. A fibrous structure was observed in carrier 5. Each aspect ratio of 48 particles out of 50 arbitrarily selected from each TEM image was below 3.

The mean pore diameter, the proportion of the pore volume in the range 2 to 20 nm in the total meso-pore volume in the range 2 to 100 nm, and the average aspect ratio are shown in Table 9 below.

TABLE 9

| | Preparation Conditions | | | Physical Properties | | |
|---|---|---|---|---|---|---|
| Carrier No. | Starting Aqueous Solution | Precipitation | Aging | Calcining Temp. (° C. × 5 hrs) | Mean Pore Diameter (nm) | 2–20 nm Particles* (%) | Average Aspect Ratio |
| 1 | aluminum nitrate: 0.4 mol; lanthanum nitrate: 0.01 mol | 25% ammonia solution: 83.6 g; pH: 8.8 | 120° C. (2 atm) × 2 hrs | 400 | 5.7 | 86 | ≦3 |
| 2 | do. | do. | do. | 800 | 9.2 | 94 | ≦3 |
| 3 | do. | do. | do. | 1000 | 13.3 | 95 | ≦3 |
| 4 | do. | do. | do. | 1200 | 17.8 | 65 | ≦3 |
| 5 | | pH swing method | | 950 | 10.0 | 67 | ≧5 (fibrous structure) |

Note: *The proportion (%) of the volume of the pores whose diameter is in a range of from 2 to 20 nm in the total volume of the pores whose diameter is in a range of from 2 to 100 nm.

(2) Preparation of Carrier 5:

Alumina prepared by the conventional pH swing method (the method for producing alumina having a porous structure disclosed in JP-A-55-27830, JP-A-58-190823, and JP-A-60-54917) was calcined at 950° C. to prepare carrier 5.

(3) Preparation of Carrier 6:

The spinel (magnesium-aluminum composite oxide) porous material obtained in Example 5 was used as carrier 6.

(4) Preparation of Carrier 7:

Magnesia powder (39 g; particle size: 0.2 μm) and alumina powder (100 g; particle size: 0.1 μm) were blended in a ball mill for 5 hours and calcined in the atmosphere at 1000° C. for 5 hours to give a spinel porous material, carrier 7.

The specific surface area of carrier 6 and carrier 7 was 95 $m^2/g$ and 23 $m^2/g$, respectively. The mean pore diameter and the proportion of the volume of the pores whose diameter is in a range of from 2 to 20 nm in the total volume of the pores whose diameter is in a range of from 2 to 100 nm of carriers 6 and 7 as obtained in the same manner as for carriers 1 to 5 are shown in Table 10 below.

TABLE 10

| Carrier No. | Preparation Conditions | | | Physical Properties | | |
|---|---|---|---|---|---|---|
| | Starting Aqueous Solution | Precipitation | Aging | Calcining Temp. (° C. × 5 hrs) | Mean Pore Diameter (nm) | 2–20 nm Particles* (%) |
| 6 | aluminum nitrate: 379 g magnesium acetate: 107 g | 25% ammonia solution: 650 g; | 120° C. (2 atm) × 2 hrs | 850 | 19.5 | 61 |
| 7 | aluminum oxide: 100 g; magnesium oxide: 39 g | — | undone | 1000 | 110 | 10 |

Note: *The proportion (%) of the volume of the pores whose diameter is in a range of from 2 to 20 nm in the total volume of the pores whose diameter is in a range of from 2 to 100 nm.

EXAMPLE 9-1
Preparation of Catalyst for Exhaust Gas Purification:

Carrier 1 was brought into contact with a dinitrodiaminoplatinum nitrate solution to deposit 2 g of Pt per 214 g-carrier. After drying, the impregnated carrier was calcined at 300° C. for 3 hours in the atmosphere. The Pt/carrier was further impregnated with a potassium acetate aqueous solution to adsorb 0.2 mol of potassium per 2 g-Pt/214 g-carrier, followed by evaporation and calcination at 300° C. for 3 hours to prepare a catalyst for exhaust gas purification (referred to "catalyst of Example 9-1"). The calcined powder was compressed and broken into pellets of 300 to 700 μm in size.

Preparation of Catalyst 1A:

A quartz tube having an inner diameter of about 10 mm was plugged with 1 g of the catalyst of Example 9-1 above prepared and set in a durability testing apparatus. A rich model gas and a lean model gas having the compositions shown in Table 11 were introduced alternately at a rate of 1 liter/min for 30 seconds each. Meanwhile the inlet gas temperature was elevated, over a 30 minute period, from room temperature up to 600° C., which temperature was maintained for 100 minutes. This treatment will be referred to as a sulfur poisoning durability test. The thus treated catalyst was designated catalyst 1A. The amount of sulfur fed to the catalyst of Example 9-1 was 2.25 mol per mole of potassium per gram of the catalyst under the treatment.

TABLE 11

| Model Gas | $O_2$ | $SO_2$ | $C_3H_6$ (% C) | CO | $H_2$ | $CO_2$ | $H_2O$ | $N_2$ |
|---|---|---|---|---|---|---|---|---|
| Lean | 7.7 | 0.096 | 0.45 | 1.43 | 0.48 | 9.6 | 3 | balance |
| Rich | 0 | 0.1 | 0.48 | 4.5 | 1.5 | 10 | 3 | balance |

(Unit: %)

EXAMPLE 9-2
Preparation of Catalyst for Exhaust Gas Purification:

A catalyst for exhaust gas purification (referred to "catalyst of Example 9-2") was prepared in the same manner as in Example 9-1, except for replacing carrier 1 with carrier 2.

Preparation of Catalyst 2A:

Catalyst 2A was prepared in the same manner as for catalyst 1A, except for replacing the catalyst of Example 9-1 with the catalyst of Example 9-2.

Preparation of Catalyst 2B:

The catalyst of Example 9-2 was subjected to a high-temperature durability test, in which the catalyst was exposed to 800° C. for 5 hours in an atmosphere alternating from a rich model gas (4 minutes) to a lean model gas (1 minute) each having the composition (%) shown in Table 12 below and being fed at a rate of 1 liter/min. The catalyst thus treated was designated catalyst

TABLE 12

| Model Gas | $O_2$ | NO | $C_3H_6$ (% C) | CO | $H_2$ | $CO_2$ | $H_2O$ | $N_2$ |
|---|---|---|---|---|---|---|---|---|
| Lean (A/F* = 22) | 6.7 | 0.16 | 0.20 | 0.08 | 0 | 8.4 | 3 | balance |
| Rich (A/F* = 14) | 0.18 | 0.17 | 0.21 | 0.69 | 0.23 | 8.9 | 3 | balance |

Note: *A/F: air/fuel weight ratio

EXAMPLE 9-3
Preparation of Catalyst for Exhaust Gas Purification:

A catalyst of Example 9-3 was prepared in the same manner as for the catalyst of Example 9-1, except for replacing carrier 1 with carrier 3.

Preparation of Catalyst 3A:

Catalyst 3A was prepared in the same manner as for catalyst 1A, except for replacing the catalyst of Example 9-1 with the catalyst of Example 9-3.

Preparation of Catalyst 3B:

Catalyst 3B was prepared in the same manner as for catalyst 2B, except for replacing the catalyst of Example 9-2 with the catalyst of Example 9-3.

EXAMPLE 9-3'
Preparation of Catalyst for Exhaust Gas Purification:

Carrier 3 was brought into contact with a dinitrodiaminoplatinum nitrate solution to deposit 2 g of Pt/120 g-carrier. After drying, the impregnated carrier was calcined at 300° C. for 3 hours in the atmosphere. The Pt/carrier was further impregnated with a potassium acetate aqueous solution to adsorb 0.2 mol of potassium per 2 g-Pt/120 g-carrier, followed by evaporation and calcination at 300° C. for 3 hours to prepare a catalyst for exhaust gas purification (referred to "catalyst of Example 9-3'). The calcined powder was compressed and broken into pellets of 300 to 700 μm in size.

Preparation of Catalyst 3'B:

Catalyst 3'B was prepared in the same manner as for catalyst 2B, except for replacing the catalyst of Example 9-2 with the catalyst of Example 9-3'.

EXAMPLE 9-4

Preparation of Catalyst for Exhaust Gas Purification:

A catalyst for purifying exhaust gases (referred to "catalyst of Example 9-4") was prepared in the same manner as in Example 9-1, except for replacing carrier 1 with carrier 4.

Preparation of Catalyst 4A:

Catalyst-4A was prepared in the same manner as for catalyst 1A, except for using the catalyst of Example 9-4 in place of the catalyst of Example 9-1.

COMPARATIVE EXAMPLE 4-1

Preparation of Catalyst for Exhaust Gas Purification:

A catalyst for purifying exhaust gases (referred to "catalyst of Comparative Example 4-1") was prepared in the same manner as in Example 9-3', except for replacing carrier 3 with carrier 5.

Preparation of Catalyst 1a:

Catalyst 1a was prepared in the same manner as for catalyst 1A, except for replacing the catalyst of Example 9-1 with the catalyst of Comparative Example 4-1.

Preparation of Catalyst 2b:

Catalyst 2b was prepared in the same manner as for catalyst 2B, except for replacing the catalyst of Example 9-2 with the catalyst of Comparative Example 4-2.

The catalysts prepared in Examples 9-1 to 9-5 and Comparative Examples 4-1 and 4-2 are summarized in Table 13 below.

Evaluation:

1) Grain Growth of Potassium Sulfate Particles and Platinum Particles

Catalysts 2A, 3A, and 1a, which are the catalysts having been subjected to a sulfur poisoning durability test, were analyzed with an X-ray diffractometer to determine the particle size of potassium sulfate ($K_2SO_4$). As for catalysts 2B, 3B, 5B, 1b, and 2b, which are the catalysts having been subjected to a high-temperature durability test, the particle size of Pt particles was determined with an X-ray diffractometer. The results obtained are shown in Table 13.

TABLE 13

| Example No. | Carrier No. | Material | $NO_2$ Storage Component (K) Content (mol/g-carrier) | Noble Metal Content (g/g-carrier) | Kind of Catalyst* | $K_2SO_4$ Particle Size (nm) | Pt Particle Size (nm) |
|---|---|---|---|---|---|---|---|
| Example 9-1 | 1 | aluminum porous | 0.2/214 | 2/214 | 1A | — | — |
| Example 9-2 | 2 | material (see Table 9) | " | " | 2A | 9.6 | — |
|  |  |  |  |  | 2B | — | 16 |
| Example 9-3 | 3 |  | " | " | 3A | 11.1 | — |
|  |  |  |  |  | 3B | — | 18 |
| Example 9-3' | 3 |  | 0.2/120 | 2/120 | 3'B | — | — |
| Example 9-4 | 4 |  | 0.2/214 | 2/214 | 4A | — | — |
| Compara. Example 4-1 | 5 |  | 0.2/120 | 0.2/120 | 1a | 14.2 | — |
|  |  |  |  |  | 1b | — | 21 |
| Example 9-5 | 6 | spinel porous material (see Table 10) | " | " | 5B | — | 45 |
| Compara. Example 4-2 | 7 |  | " | " | 2b | — | 63 |

Note: *The upper row: catalysts exposed to sulfur poisoning; the lower row: catalysts exposed to high temperature Preparation of Catalyst 1b:

Catalyst 1b was prepared in the same manner as for catalyst 2B, except for replacing the catalyst of Example 9-2 with the catalyst of Comparative Example 4-1.

EXAMPLE 9-5

Preparation of Catalyst for Exhaust Gas Purification:

A catalyst for purifying exhaust gases (referred to "catalyst of Example 9-5") was prepared in the same manner as in Example 9-3', except for replacing carrier 4 with carrier 6.

Preparation of Catalyst 5B:

Catalyst 5B was prepared in the same manner as for catalyst 2B, except for using the catalyst of Example 9-5 in place of the catalyst of Example 9-2.

COMPARATIVE EXAMPLE 4-2

Preparation of Catalyst for Exhaust Gas Purification:

A catalyst for exhaust gas purification (referred to "catalyst of Comparative Example 4-2") was prepared in the same manner as in Example 9-3', except for replacing carrier 4 with carrier 7.

The results show that the potassium sulfate particles resulting from sulfur poisoning are smaller in catalyst 2A having carrier 2 and catalyst 3A having carrier 3 than in catalyst 1a having carrier 5. This is due to suppression of sulfate grain growth in the catalysts of the invention.

Comparing the platinum particles, after exposure to high-temperature, of catalysts having an alumina porous material, they are smaller in catalyst 2B having carrier 2 and catalyst 3B having carrier 3 than in catalyst 1b having carrier 5. As for the catalysts having a spinel porous material the Pt particles are smaller in catalyst 5B having carrier 6 than in catalyst 2b having carrier 7. It is recognized that Pt grain growth is suppressed in the catalysts of the invention whichever carrier is used.

2) Saturation Storage of $NO_x$ and rich spike $NO_x$ Storage:

2-1) After Sulfur Poisoning

The tubular reactor of a fixed bed catalytic reactor was loaded with 0.5 g each of catalysts 1A, 2A, 3A, 4A, and 1a. The catalyst was placed in a lean atmosphere by introducing a lean gas having the composition (%) shown in Table 14 shown below at a rate of 3 liter/min to store $NO_x$ in the form of nitrate and, in a rich atmosphere by introducing a rich gas having the composition (%) shown in Table 14 for 3 seconds to reduce $NO_x$ into $N_2$, etc. The inlet gas temperature was at 250° C., 300° C. or 400° C. The $NO_x$ saturation storage, indicative of the maximum amount of $NO_2$ stored, and the rich spike $NO_x$ storage, indicative of the amount of reduced $NO_x$, are shown in Table 15.

TABLE 14

| Model Gas | $O_2$ | CO | $H_2$ | $C_3H_6$ (% C) | NO | $H_2O$ | $CO_2$ | He |
|---|---|---|---|---|---|---|---|---|
| Lean | 6.63 | 0 | 0 | 0.07 | 0.08 | 3 | 11 | balance |
| Rich | 0 | 5.60 | 1.87 | 0.34 | 0.005 | 3 | 11 | balance |

TABLE 15

| Catalyst* | $NO_x$ Saturation Storage ($\mu$mol/g) | | | Rich Spike $NO_x$ Storage ($\mu$mol/g) | | |
|---|---|---|---|---|---|---|
| (Carrier) | 250° C. | 300° C. | 400° C. | 250° C. | 300° C. | 400° C. |
| 1A (carrier 1) | 79.4 | 62.0 | 25.0 | 6.8 | 8.8 | 13.8 |
| 2A (carrier 2) | 78.4 | 63.3 | 35.1 | 4.5 | 8.2 | 18.1 |
| 3A (carrier 3) | 53.0 | 41.3 | 20.8 | 4.1 | 7.0 | 13.3 |
| 4A (carrier 4) | 50.0 | 39.4 | 20.7 | 3.9 | 6.2 | 13.3 |
| 1a (carrier 5) | 49.2 | 38.8 | 20.4 | 3.9 | 6.0 | 13.1 |

Note: *See Table 13

As is obvious from Table 15, catalysts 1A, 2A, 3A, and 4A having carriers 1, 2, 3, and 4, respectively, have a higher $NO_x$ saturation storage and a higher rich spike $NO_x$ storage than catalyst 1a having carrier 5 at any testing temperature, proving excellent in catalytic performance after sulfur poisoning.

Above all, the catalysts having a carrier whose pore size distribution is such that the proportion of the volume of the pores in a range of from 2 to 20 nm in the total volume of the pores in a range of from 2 to 100 nm is 70% or more, i.e., catalysts 1A, 2A and 3A are particularly excellent in $NO_x$ saturation storage and rich spike $NO_x$ storage.

2—2) After Exposure to High-temperature

The tubular reactor of a fixed bed catalytic reactor was loaded with 0.5 g each of catalysts 3'B, 1b, 5B, and 2b. The catalyst was placed in a lean atmosphere by introducing a lean gas at a rate of 3 liter/min to store $NO_x$ in the form of nitrate and, in a rich atmosphere by introducing a rich gas for 3 seconds to reduce $NO_x$ into $N_2$. etc. The treatment was carried out at 300° C., 400° C., 500° C. or 600° C. The $NO_x$ saturation storage and the rich spike $NO_x$ storage are shown in Table 16. The lean gas and the rich gas used for catalysts 3'B and 1b were the same as used in (2-1). The lean gas and the rich gas used for catalysts 5B and 2b had the compositions shown in Table 17.

TABLE 16

| Catalyst* | $NO_x$ Saturation Storage ($\mu$mol/g) | | | | Rich Spike $NO_x$ Storage ($\mu$mol/g) | | | |
|---|---|---|---|---|---|---|---|---|
| (Carrier) | 300° C. | 400° C. | 550° C. | 600° C. | 300° C. | 400° C. | 500° C. | 600° C. |
| 3'B (carrier 3) | 154.6 | 234.8 | 273.3 | 141.5 | 20.8 | 41.7 | 173.9 | 97.1 |
| 1b (carrier 5) | 156.2 | 184.0 | 129.4 | 48.5 | 19.1 | 37.5 | 105.6 | 41.3 |
| 5B (carrier 6) | 412.2 | 434.4 | 568.4 | 324.2 | 30.4 | 171.4 | 181.2 | 260.6 |
| 2b (carrier 7) | 256.1 | 312.3 | 372.1 | 220.9 | 15.4 | 78.2 | 102.7 | 137.6 |

Note: *See Table 13

TABLE 17

| Model Gas | $O_2$ | CO | $H_2$ | $C_3H_6$ (% C) | NO | $H_2O$ | He |
|---|---|---|---|---|---|---|---|
| Lean | 4.1 | 0 | 0 | 0.24 | 0.08 | 0 | balance |
| Rich | 0.43 | 0.45 | 0.15 | 0.68 | 0.01 | 0 | balance |

As is apparent from Table 16, catalyst 3'B having the alumina porous material of the invention has higher catalytic performance after the high-temperature durability test than catalyst 1b having the comparative alumina porous material in terms of $NO_x$ saturation storage at testing temperatures except 300° C. and in rich spike $NO_x$ storage at all the testing temperatures. With respect to spinel porous carriers, catalyst 5B having carrier 6 is superior to catalyst 2b having carrier 7 in both $NO_x$ saturation storage and rich spike $NO_x$ storage at any testing temperature.

The present invention provides a novel porous material which is characterized in that (1) the mean pore diameter is in a meso-pore region, (2) the pores have a sharp size distribution, (3) at least a part of the pores are connected three-dimensionally to form a three-dimensional network structure with random passages, and (4) the porous material has substantially no fibrous structure, and is suited for use as a catalyst, a carrier for catalysts, various filters, a carrier for enzymes, an adsorbent, a filler, and so forth.

Specifically, the porous material of the invention includes, in its first aspect, an alumina porous material that is amorphous and has a spongy structure and, in the second aspect, a porous material that is made up of particles, preferably of crystalline oxide and/or crystalline complex oxide selected from the group consisting of alumina, zirconia, titania, magnesia, iron oxide, and ceria, having an aspect ratio of 3 or smaller and aggregate together to form pores among the particles.

The invention also provides a process for producing the porous material of the invention through simple means at low cost. According to the process, a second component for quality improvement, such as a rare earth element, an alkaline earth metal or a IV group element, can easily be incorporated into the porous material.

The invention further provides an excellent catalyst for purifying exhaust gases which comprises a carrier and a noble metal supported thereon, wherein at least a part of the carrier is the porous material of the invention. Since a noble metal can be adsorbed in the vicinity of the carrier surface in an increased concentration, ordinary techniques for noble metal adsorption suffice to achieve a high concentration of a noble metal on the carrier surface to provide a catalyst with excellent exhaust gas purification performance.

In a preferred embodiment, the catalyst further has an $NO_x$ storage component deposited on the carrier, the $NO_x$ storage component comprising at least one of an alkali metal, an alkaline earth metal, and a rare earth element. The catalyst according to this embodiment exhibits high $NO_x$ removal performance, high resistance against sulfur poisoning, and high high-temperature durability because it suppresses grain growth of a sulfite or a sulfate resulting from the reaction between $SO_x$ and the $NO_x$ storage component and/or grain growth of the noble metal that occurs especially in a high-temperature exhaust gas while certainly retaining the $NO_x$ storing ability of the $NO_x$ storage component and the catalytic performance of the noble metal.

The second porous material of the invention is particularly effective in supporting the noble metal stably and in a highly disperse state thereby providing a catalyst with high ability to remove $NO_x$ from an exhaust gas. Where the second porous material composed of crystalline oxide particles is used, the catalyst exhibits particularly excellent $NO_x$ removal performance because the noble metal hardly moves thereon due to the crystal planes and are therefore prevented from agglomerating in high temperature.

The invention furthermore provides a catalyst for purifying exhaust gases which can make effective use of an oxide and/or complex oxide comprising at least one of alumina, zirconia, titania, iron oxide, ceria, and magnesia.

The second porous material of the invention can contain an additive component selected from the group consisting of a rare earth element, an alkaline earth metal, and a group IV element to have improved or modified heat resistance or other properties, thereby providing a catalyst with improved or modified properties. Addition of lanthanum as such an additive component is especially effective at improvement of heat resistance of the porous material, providing a highly heat-resistant catalyst for exhaust gas purification.

The catalyst having the first porous material of the invention as a carrier is particularly effective in suppressing grain growth of the noble ability to remove $NO_x$.

It is a preferred embodiment of the catalyst containing the $NO_x$ storage component that the porous material as a carrier has such a pore size distribution that the proportion of the volume of the pores whose diameter is in a range of from 2 to 20 nm in the total volume of the pores whose diameter is in a range of from 2 to 100 nm is 70% or more. The catalyst according to this embodiment suppresses, with more certainty, grain growth of a sulfite or a sulfate resulting from the reaction between $SO_x$ and the $NO_x$ storage component and/or grain growth of the noble metal that occurs especially in a high-temperature exhaust gas and is therefore excellent in $NO_x$ removal performance, sulfur poisoning resistance, and high-temperature durability.

The invention furthermost provides a method of exhaust gas purification achieving high $NO_x$ removal performance and high resistance against sulfur poisoning owing to the above-described advantages.

While the invention has been described in detail and with reference to specific examples thereof, it will be apparent to one skilled in the art that various changes and modifications can be made therein without departing from the spirit and scope thereof.

What is claimed is:

1. A porous material, comprising:
   particles without substantial fibrous structure;
   wherein said porous material has pores;
   wherein the pores have a mean pore diameter in a meso-pore region; and
   wherein at least a part of the pores are connected three-dimensionally to form a three-dimensional network structure with random passages.

2. The porous material according to claim 1, wherein said mean pore diameter is in a range of from 2 to 100 nm.

3. The porous material according to claim 1, wherein said particles are alumina; and
   wherein said three-dimensional network structure has a spongy structure.

4. A process for producing the porous material according to claim 1, comprising:
   (1) preparing a system capable of becoming an oxide on thermal decomposition;
   (2) aging said system at or above room temperature for a prescribed time to form a precursor; and
   (3) calcining the precursor to form the porous material according to claim 1
   wherein said aging is carried out in saturated vapor or nearly saturated vapor for a prescribed period of time to form a precursor.

5. The porous material according to claim 1, wherein said porous material is amorphous and the pores exist on a surface and in an inside of said porous material.

6. The porous material according to claim 5, wherein a volume of the pores within 5 nm of the mean pore diameter occupies 70% or more of a total meso-pore volume; and
   wherein said total meso-pore volume is the volume of pores whose diameter is in a range of 2 to 100 nm.

7. The porous material according to claim 5, wherein a volume of the pores within 5 nm of the mean pore diameter occupies 80% or more of a total meso-pore volume; or
   wherein the volume of the pores within 3 nm of the mean pore diameter occupies 70% or more of the total meso-pore volume; and
   wherein said total meso-pore volume is the volume of pores whose diameter is in a range of 2 to 100 nm.

8. The porous material according to claim 5, wherein a volume of the pores within 3 nm of the mean pore diameter occupies 90% or more of a total mew-pore volume; and
   wherein said total meso-pore volume is the volume of pores whose diameter is in a range of 2 to 100 nm.

9. The porous material according to claim 1, wherein the particles have an aspect ratio of 3 or smaller and aggregate together to form pores among the particles.

10. The porous material according to claim 9, wherein the particles are crystalline oxides which are connected three-dimensionally to form pores among the particles.

11. The porous material according to claim 10, which comprises at least one of a crystalline oxide or a crystalline complex oxide selected from the group consisting of alumina, zirconia, titania, magnesia, iron oxide, and ceria.

12. The porous material according to claim 10, wherein said porous material is an alumina porous material; and
   wherein a volume of the pores within 5 nm of the mean pore diameter occupies 70% or more of a total meso-pore volume; and
   wherein said total meso-pore volume is the volume of pores whose diameter is in a range of 2 to 100 nm.

13. The porous material according to claim 10, wherein said porous material is an alumina porous material; and
   wherein a volume of the pores within 5 nm of the mean pore diameter occupies 80% or more of a total meso-pore volume; or
   wherein a volume of the pores within 3 nun of the mean pore diameter occupies 70% or more of a total meso-pore volume; and
   wherein said total meso-pore volume is the volume of pores whose diameter is in a range of 2 to 100 nm.

14. The porous material according to claim 10, wherein said porous material is an alumina porous material; and wherein a volume of the pores within 3 nm of the mean pore diameter occupies 90% or more of a total meso-pore volume; and wherein said total meso-pore volume is the volume of pores whose diameter is in a range of 2 to 100 nm.

15. The porous material according to claim 10, wherein said porous material is a zirconia porous material; and wherein a volume of the pores within 5 nm of the mean pore diameter occupies 40% or more of a total meso-pore volume; and wherein said total meso-pore volume is the volume of pores whose diameter is in a range of 2 to 100 nm.

16. The porous material according to claim 10, wherein said porous material is a titania porous material; and wherein a volume of the pores within 5 nm of the mean pore diameter occupies 50% or more of a total meso-pore volume; or wherein a volume of the pores within 3 nm of the mean pore diameter occupies 40% or more of a total meso-pore volume; and wherein said total meso-pore volume is the volume of pores whose diameter is in a range of 2 to 100 nm.

17. The porous material according to claim 10, wherein said porous material is a magnesia porous material; and wherein a volume of the pores within 5 nm of the mean pore diameter occupies 80% or more of a total meso-pore volume; and wherein said total meso-pore volume is the volume of pores whose diameter is in a range of 2 to 100 nm.

18. The porous material according to claim 10, wherein said porous material is a ceria porous material; and wherein a volume of the pores within 5 nm of the mean pore diameter occupies 70% or more of a total meso-pore volume; or wherein a volume of the pores within 3 nm of the mean pore diameter occupies 55% or more of a total meso-pore volume; and wherein said total meso-pore volume is the volume of pores whose diameter is in a range of 2 to 100 nm.

19. A catalyst for purifying exhaust gases, comprising:

a carrier; and a noble metal supported on said carrier;

wherein at least a part of said carrier comprises the porous material according to claims 5 or 10.

20. A catalyst for purifying exhaust gases, comprising:

a carrier;

an NOX storage component comprising at least one member selected from the group consisting of an alkali metal, an alkaline earth metal, and a rare earth element, wherein said NOX storage component is supported on said carrier; and a noble metal supported on said carrier, in which at least a part of said carrier comprises the porous material according to claim 5 or 10.

* * * * *